(12) United States Patent
Miyake

(10) Patent No.: US 10,372,163 B2
(45) Date of Patent: Aug. 6, 2019

(54) INPUT DEVICE COMPRISING SENSOR PANEL, INFORMATION PROCESSING DEVICE COMPRISING INPUT DEVICE

(71) Applicant: Semiconductor Energy Laboratory Co., Ltd., Kanagawa-ken (JP)

(72) Inventor: Hiroyuki Miyake, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 14/724,336

(22) Filed: May 28, 2015

(65) Prior Publication Data

US 2015/0346776 A1 Dec. 3, 2015

(30) Foreign Application Priority Data

May 30, 2014 (JP) .................................. 2014-112825
Jun. 23, 2014 (JP) .................................. 2014-128475

(51) Int. Cl.
| | | |
|---|---|---|
| G06F 3/045 | (2006.01) | |
| G06F 3/044 | (2006.01) | |
| G06F 1/16 | (2006.01) | |
| G06F 3/02 | (2006.01) | |
| G06F 3/0488 | (2013.01) | |
| G09F 9/30 | (2006.01) | |

(52) U.S. Cl.
CPC .......... *G06F 1/1652* (2013.01); *G06F 3/0202* (2013.01); *G06F 3/044* (2013.01); *G06F 3/0488* (2013.01); *G09F 9/301* (2013.01); *G06F 2203/04102* (2013.01); *G06F 2203/04103* (2013.01); *G06F 2203/04111* (2013.01)

(58) Field of Classification Search
CPC ...... G06F 3/044; G06F 1/1652; G06F 3/0202; G06F 3/0488; G09F 9/301
USPC ........................................ 345/174; 178/18.06
See application file for complete search history.

(56) References Cited

U.S. PATENT DOCUMENTS

| | | | |
|---|---|---|---|
| 6,372,608 B1 | 4/2002 | Shimoda et al. | |
| 6,828,727 B2 | 12/2004 | Yamazaki | |
| 7,027,110 B2 | 4/2006 | Akiyama et al. | |
| 7,242,445 B2 | 7/2007 | Akiyama et al. | |
| 8,367,440 B2 | 2/2013 | Takayama et al. | |
| 8,415,208 B2 | 4/2013 | Takayama et al. | |
| 8,654,095 B1* | 2/2014 | Cho ..................... | G06F 1/1652 |
| | | | 345/173 |
| 2002/0027636 A1 | 3/2002 | Yamada | |
| 2004/0183958 A1 | 9/2004 | Akiyama et al. | |

(Continued)

FOREIGN PATENT DOCUMENTS

| | | |
|---|---|---|
| JP | 2003-174153 | 6/2003 |
| JP | 2004-279867 A | 10/2004 |

(Continued)

*Primary Examiner* — Adam J Snyder
(74) *Attorney, Agent, or Firm* — Husch Blackwell LLP

(57) ABSTRACT

A novel input device that is highly convenient or reliable is provided. Alternatively, a novel input device is provided. The input device includes a sensor panel that can be folded, a housing that enables the sensor panel to be folded, and a sensing portion that senses the folded state of the sensor panel and supplies folding information. Furthermore, the sensor panel includes a signal line extending in the column direction, and a part of one signal line is placed to face another part of the signal line in the folded state.

27 Claims, 12 Drawing Sheets

(56) References Cited

U.S. PATENT DOCUMENTS

| | | | |
|---|---|---|---|
| 2006/0125973 A1 | 6/2006 | Akiyama et al. | |
| 2009/0189867 A1* | 7/2009 | Krah | G06F 3/044 345/173 |
| 2010/0064244 A1* | 3/2010 | Kilpatrick, II | G06F 1/1654 345/1.3 |
| 2010/0066643 A1 | 3/2010 | King et al. | |
| 2010/0117975 A1* | 5/2010 | Cho | G06F 1/1652 345/173 |
| 2011/0210937 A1* | 9/2011 | Kee | G06F 3/041 345/173 |
| 2012/0162099 A1* | 6/2012 | Yoo | G06F 3/044 345/173 |
| 2012/0217516 A1 | 8/2012 | Hatano et al. | |
| 2012/0235894 A1* | 9/2012 | Phillips | G09G 3/36 345/156 |
| 2012/0293430 A1 | 11/2012 | Kitada | |
| 2013/0044384 A1 | 2/2013 | Kim et al. | |
| 2013/0076597 A1* | 3/2013 | Becze | G06F 3/044 345/1.3 |
| 2013/0214324 A1 | 8/2013 | Takayama et al. | |
| 2013/0278513 A1* | 10/2013 | Jang | G06F 3/044 345/173 |
| 2013/0300678 A1* | 11/2013 | Kang | G06F 3/044 345/173 |
| 2013/0341651 A1* | 12/2013 | Kim | G06F 3/044 257/432 |
| 2014/0132553 A1* | 5/2014 | Park | G06F 3/044 345/174 |
| 2014/0139447 A1* | 5/2014 | Kang | G06F 3/044 345/173 |
| 2014/0145977 A1* | 5/2014 | Kang | G06F 3/044 345/173 |
| 2014/0225629 A1* | 8/2014 | Igari | G06F 3/044 324/662 |
| 2015/0062028 A1* | 3/2015 | Go | G06F 1/1652 345/173 |
| 2015/0241924 A1* | 8/2015 | Chang | G06F 3/044 349/12 |

FOREIGN PATENT DOCUMENTS

| | | |
|---|---|---|
| JP | 2005-114759 A | 4/2005 |
| JP | 2008-293680 A | 12/2008 |
| JP | 2010-099122 A | 5/2010 |
| JP | 2012-190794 A | 10/2012 |
| JP | 2012-243058 A | 12/2012 |
| JP | 2014-068288 A | 4/2014 |
| WO | WO 2001/053919 A2 | 7/2001 |

* cited by examiner

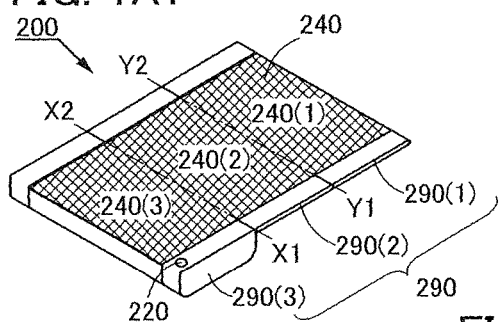
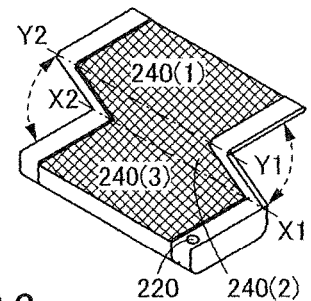
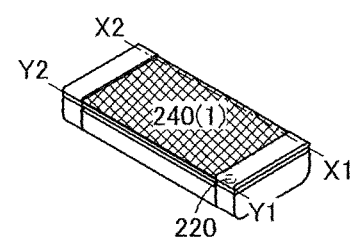
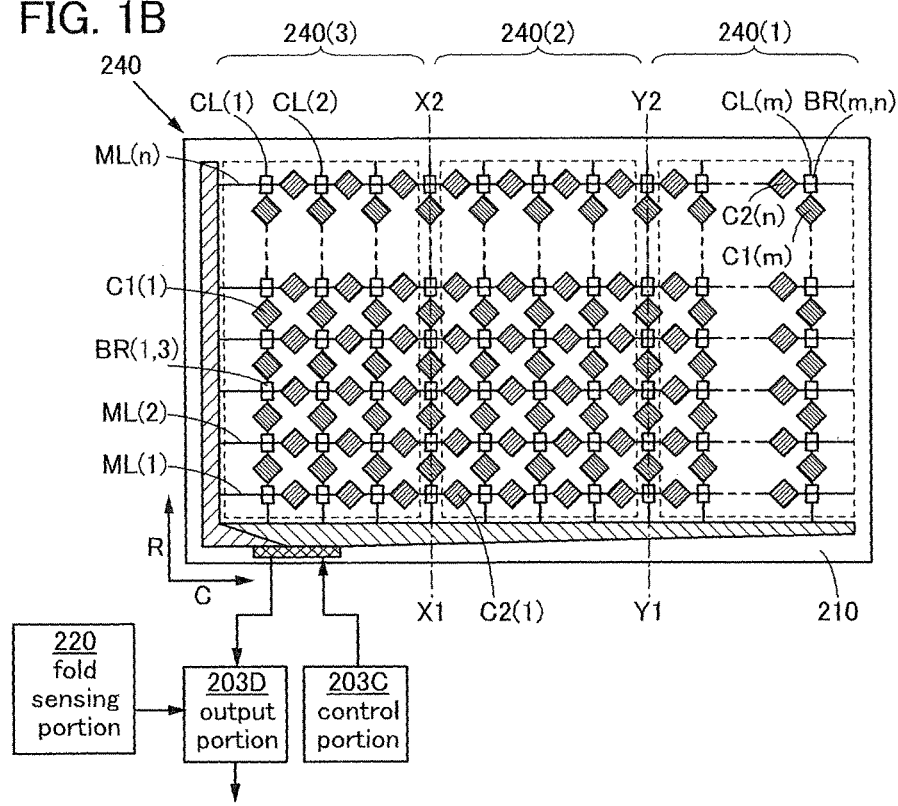

500TP

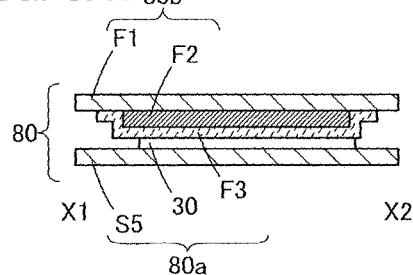
FIG. 5A1
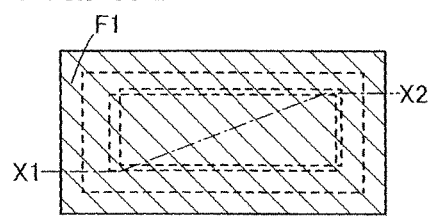
FIG. 5A2
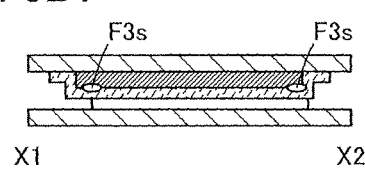
FIG. 5B1
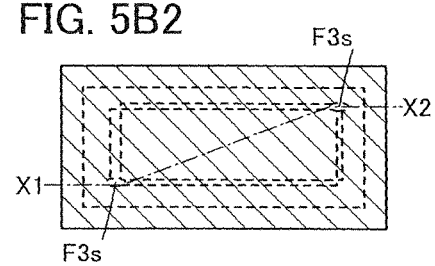
FIG. 5B2
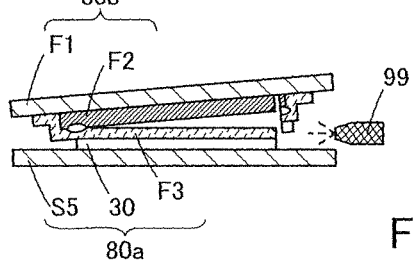
FIG. 5C
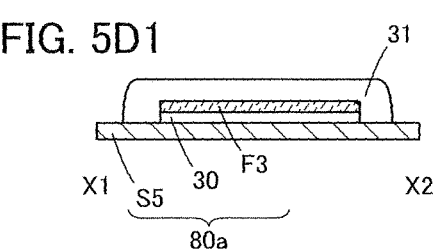
FIG. 5D1
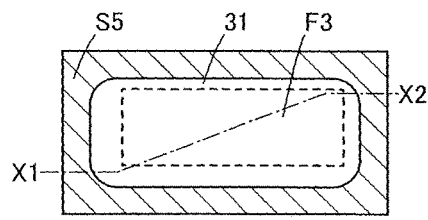
FIG. 5D2
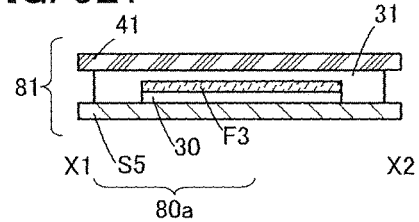
FIG. 5E1
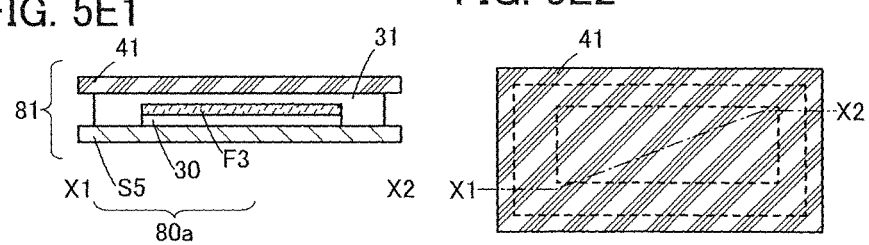
FIG. 5E2

FIG. 6A1 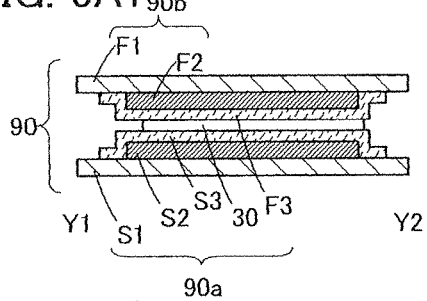
FIG. 6A2 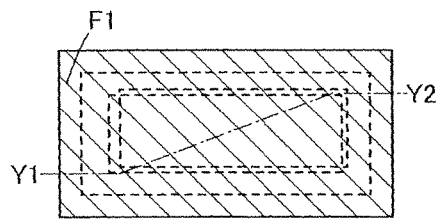
FIG. 6B1 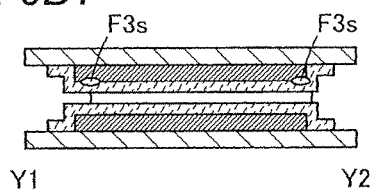
FIG. 6B2 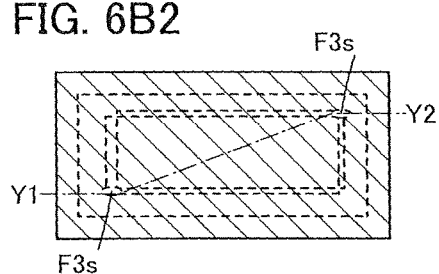

FIG. 6D1 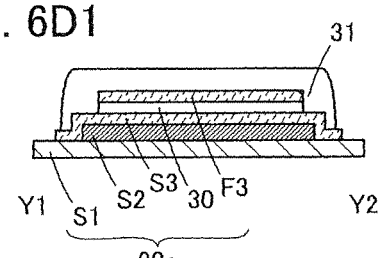
FIG. 6D2 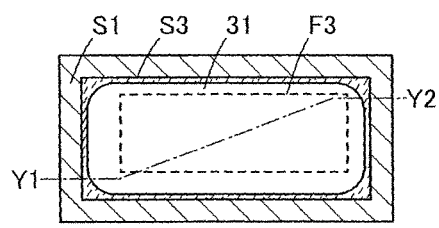
FIG. 6E1 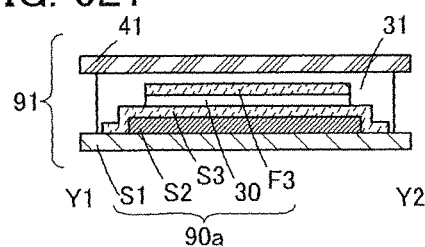
FIG. 6E2 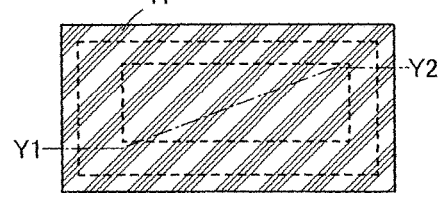

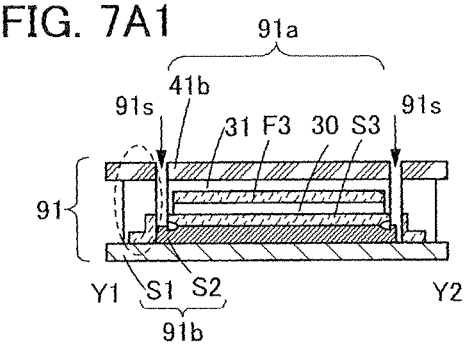
FIG. 7A1
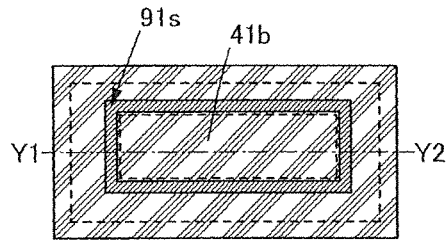
FIG. 7A2
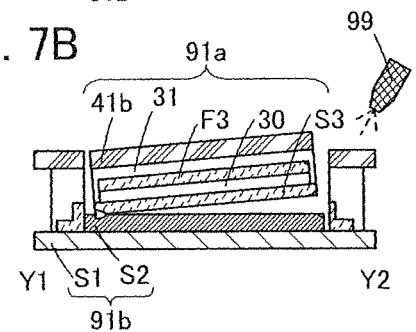
FIG. 7B
FIG. 7C
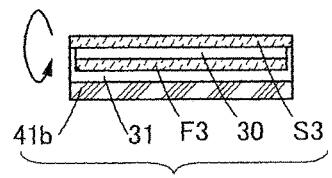
FIG. 7D1
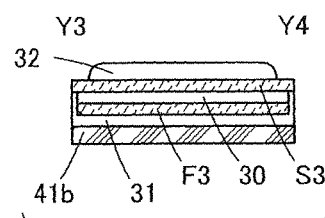
FIG. 7D2
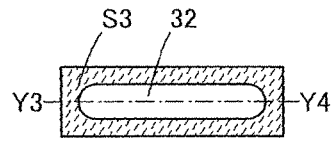
FIG. 7E1
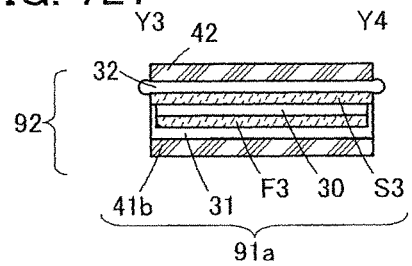
FIG. 7E2
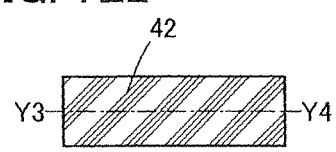

FIG. 8A1
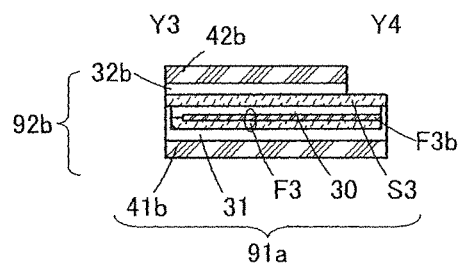
FIG. 8A2
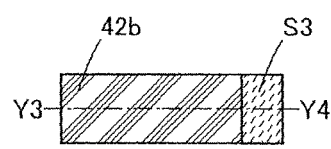
FIG. 8B1
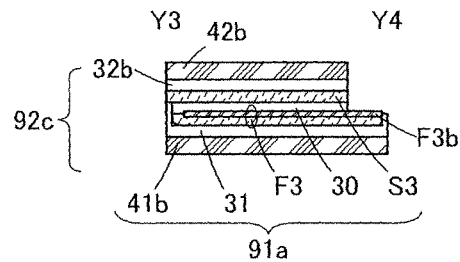
FIG. 8B2
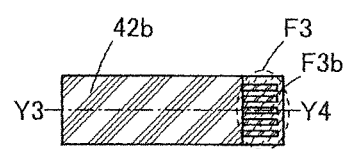
FIG. 8C1
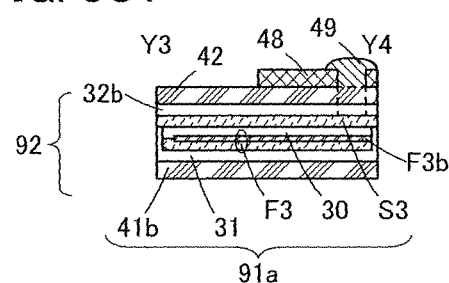
FIG. 8C2
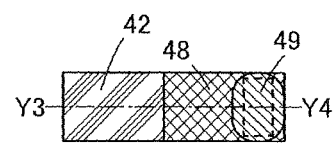
FIG. 8D1
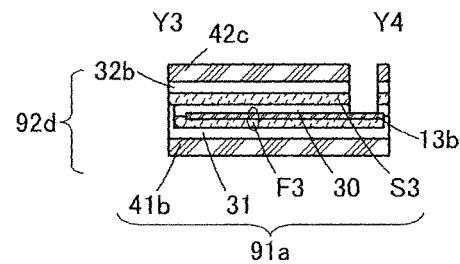
FIG. 8D2

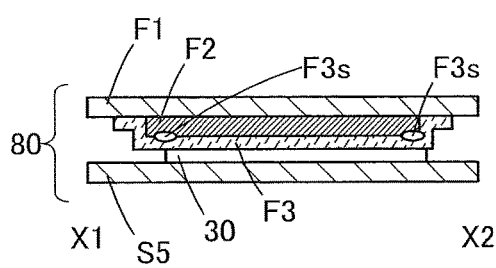
FIG. 9A1
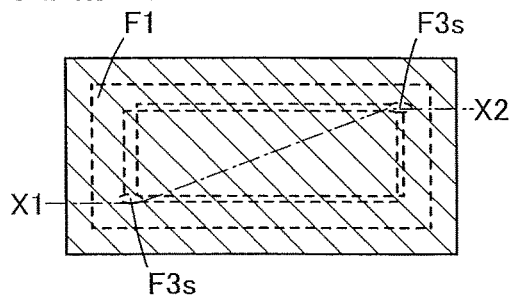
FIG. 9A2
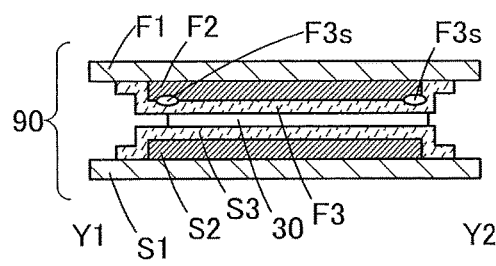
FIG. 9B1
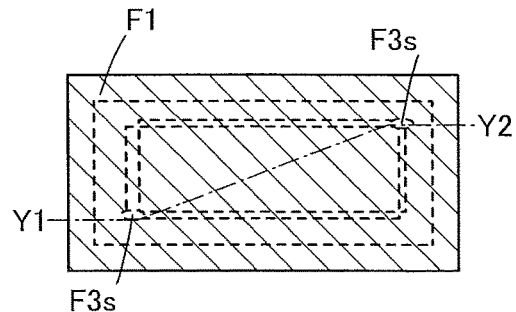
FIG. 9B2

FIG. 11A1  FIG. 11A2  FIG. 11A3
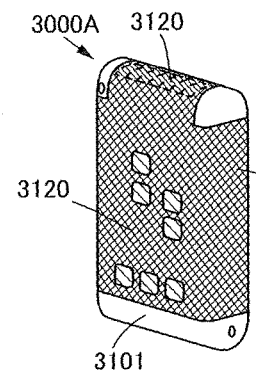
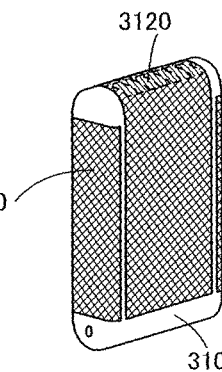
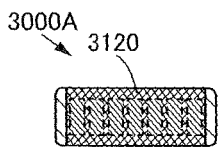
FIG. 11B1  FIG. 11B2
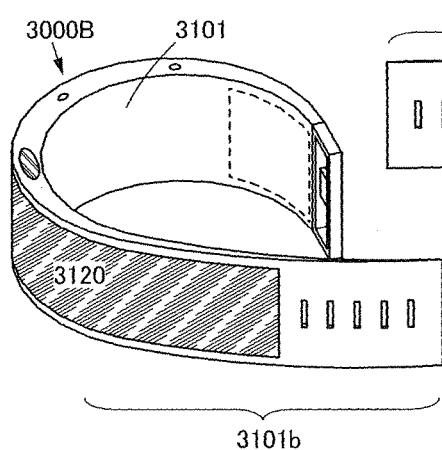
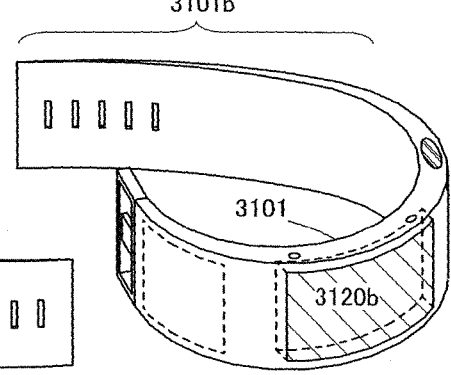
FIG. 11C1  FIG. 11C2
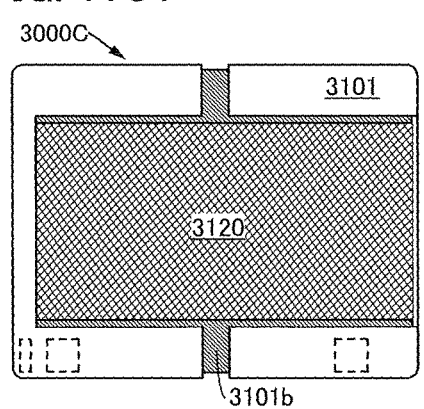
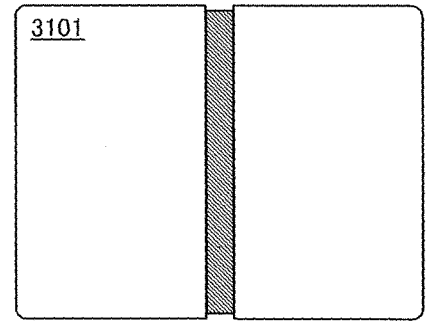

INPUT DEVICE COMPRISING SENSOR PANEL, INFORMATION PROCESSING DEVICE COMPRISING INPUT DEVICE

BACKGROUND OF THE INVENTION

1. Field of the Invention

One embodiment of the present invention relates to an input device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, an information processing device, a method for driving any of them, and a method for manufacturing any of them.

2. Description of the Related Art

The social infrastructures relating to means for transmitting information have advanced. This has made it possible to acquire, process, and send out many pieces and various kinds of information with the use of an information processing device not only at home or office but also at other visiting places.

With this being the situation, portable information processing devices are under active development.

For example, portable information processing devices are often used while being carried around by a user, and force might be accidentally applied, by dropping, to the information processing devices and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

SUMMARY OF THE INVENTION

An object of one embodiment of the present invention is to provide a novel input device that is highly convenient or reliable. Another object is to provide a novel input device or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is an input device including a sensor panel, a fold sensing portion, a control portion, an output portion, and a housing.

The sensor panel is supplied with a control signal and supplies a sensing signal, and can be folded and unfolded.

The fold sensing portion senses the folded state and the unfolded state of the sensor panel, and supplies folding information.

The control portion supplies the control signal.

The output portion supplies sensing information on the basis of the sensing signal and the folding information.

The housing enables the sensor panel to be folded and unfolded.

The sensor panel includes a plurality of control lines, a plurality of signal lines, and a base.

The control line extends in the row direction and can be supplied with the control signal.

The signal line extends in the column direction and can supply the sensing signal.

The base has flexibility and supports the control line and the signal line.

A part of the signal line is placed to face another part of the signal line in the folded state.

Another embodiment of the present invention is the above input device in which the sensor panel includes a first electrode and a second electrode.

The first electrode is electrically connected to one control line.

The second electrode is electrically connected to one signal line and has a portion that does not overlap with the first electrode.

The base supports the first electrode and the second electrode.

A part of the second electrode is placed to face another part of the second electrode in the folded state.

The input device of one embodiment of the present invention includes the sensor panel, the housing that enables the sensor panel to be folded, and a sensing portion that senses the folded state of the sensor panel and supplies folding information. The sensor panel includes the signal line that extends in the column direction. A part of one signal line is placed to face another part of the signal line in the folded state. Thus, electrodes whose potentials are substantially equal to each other are placed to face each other on one signal line, and an increase in parasitic capacitance of the signal line in the folded state can be suppressed. Moreover, sensing information based on the folding information and electrostatic capacitance that is changed when a sensing target such as a finger approaches or is in contact with the control line or the signal line can be supplied together with positional information of the control line and the signal line. Consequently, a novel input device that is highly convenient or reliable can be provided.

Another embodiment of the present invention is the above input device in which the control lines include a first control line and a second control line.

The signal line includes a signal line that intersects with the first control line and the second control line.

The control portion has a function of supplying a first control signal modulated by a first method to the first control line and a function of supplying a second control signal modulated by a second method that is different from the first method to the second control line.

The output portion is electrically connected to the signal line, and has a function of separating a first sensing signal based on the first control signal and a second sensing signal based on the second control signal from sensing signals supplied to the signal line.

The input device of one embodiment of the present invention includes a control portion that can supply control signals modulated by different methods to respective control lines and an output portion in which a sensing signal that is changed on the basis of electrostatic capacitance and the control signals modulated by different methods can be separated from sensing signals supplied to one signal line according to the modulation methods of the control signals. With such a structure, control signals are supplied to the first control line and the second control line at substantially the same time, and sensing signals sensed at a portion at which the first control line intersects with the signal line and at a portion at which the second control line intersects with the signal line can be separated from sensing signals supplied to the signal line. Consequently, a novel input device that is highly convenient or reliable can be provided.

Another embodiment of the present invention is the above input device including a display portion.

The display portion overlaps with the sensor panel.

The housing enables the display portion to be folded and unfolded together with the sensor panel.

The display portion includes a pixel.

The first electrode or the second electrode includes a net-like conductive film including an opening portion at a position overlapping with the pixel.

The input device of one embodiment of the present invention includes the sensor panel and the display portion that overlaps with the sensor panel and can be folded and unfolded together with the sensor panel. A first electrode or a second electrode includes a net-like conductive film having opening portions at positions overlapping with the pixels of the display portion. Thus, the first electrode or the second electrode of the sensor panel having a small thickness with which the sensor panel can be folded or unfolded can reduce the degree of capacitive coupling with various conductive films and the like included in the display portion. Consequently, a novel input device that is highly convenient or reliable can be provided.

Note that in this specification, the device also includes any of the following: a module mounted with a connector such as a flexible printed circuit (FPC) or a tape carrier package (TCP); a module having a TCP provided with a printed wiring board at the end thereof; and a substrate on which an integrated circuit (IC) is mounted by a chip on glass (COG) method.

In block diagrams, components are classified according to their functions and shown as independent blocks. It is difficult to separate actual components completely, and one component might relate to a plurality of functions.

According to one embodiment of the present invention, a novel input device that is highly convenient or reliable can be provided. Alternatively, a novel input device or a novel semiconductor device can be provided.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:

FIGS. 1A1, 1A2, 1A3, and 1B are projection views and a block diagram illustrating a structure of an input device of one embodiment;

FIG. 3 is a projection view illustrating a structure of an input/output device of one embodiment.

FIGS. 5A1, 5A2, 5B1, 5B2, 5C, 5D1, 5D2, 5E1, and 5E2 are schematic views illustrating a manufacturing process of a stack of one embodiment;

FIGS. 6A1, 6A2, 6B1, 6B2, 6C, 6D1, 6D2, 6E1, and 6E2 are schematic views illustrating a manufacturing process of a stack of one embodiment;

FIGS. 7A1, 7A2, 7B, 7C, 7D1, 7D2, 7E1, and 7E2 are schematic views illustrating a manufacturing process of a stack of one embodiment;

FIGS. 8A1, 8A2, 8B1, 8B2, 8C1, 8C2, 8D1, and 8D2 are schematic views illustrating manufacturing processes of stacks each having an opening portion in a support of one embodiment;

FIGS. 9A1, 9A2, 9B1, and 9B2 are schematic views illustrating structures of a processed member of one embodiment;

FIGS. 11A1, 11A2, 11A3, 11B1, 11B2, 11C1, and 11C2 are projection views illustrating structures of information processing devices of one embodiment.

DETAILED DESCRIPTION OF THE INVENTION

Figure 2A:
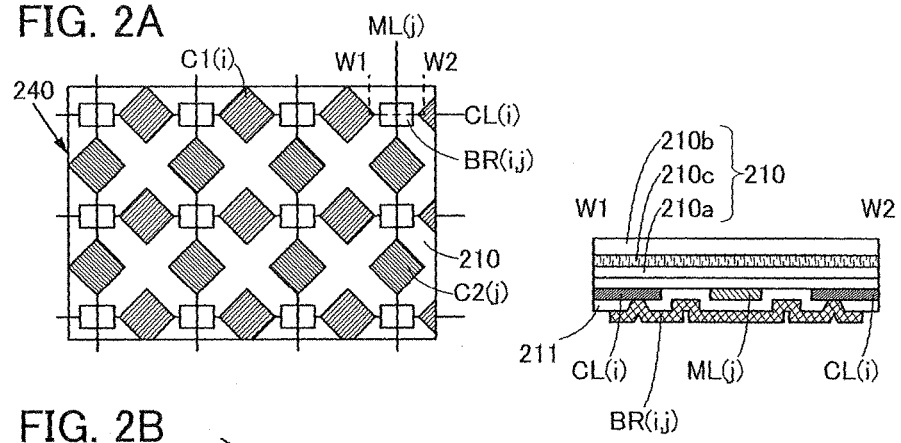
FIGS. 2A to 2D are schematic diagrams illustrating structures of a sensor panel of one embodiment.

An input device of one embodiment of the present invention includes a sensor panel that can be folded and a housing that enables the sensor panel to be folded. The sensor panel includes a signal line that extends in the column direction, and a part of one signal line is placed to face another part of the signal line in the folded state.

Thus, electrodes whose potentials are substantially equal to each other are placed to face each other on one signal line, and an increase in parasitic capacitance of the signal line in the folded state can be suppressed. Consequently, a novel input device that is highly convenient or reliable can be provided.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

(Embodiment 1)

In this embodiment, a structure of an input device 200 of one embodiment of the present invention is described with reference to FIGS. 1A1, 1A2, 1A3, and 1B, FIGS. 2A to 2D, and FIGS. 12A and 12B.

Figures 12A, 12B:
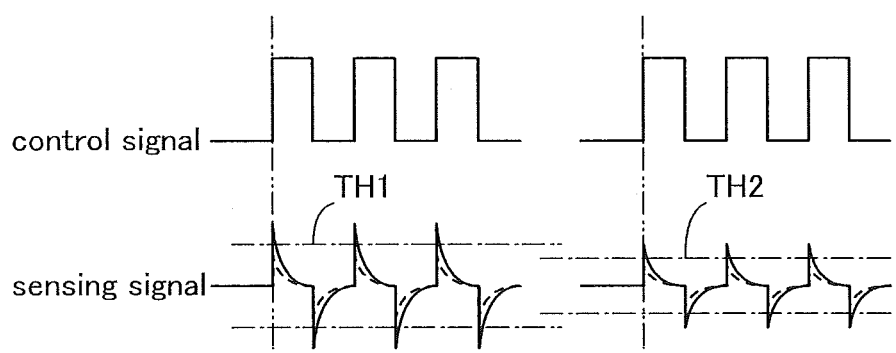
FIGS. 12A and 12B show operations of an output portion in an input/output device of one embodiment.

FIGS. 1A1, 1A2, 1A3, and 1B illustrate a structure of an input device of one embodiment of the present invention. FIGS. 2A to 2D illustrate structures of a sensor panel in an input device of one embodiment of the present invention. FIGS. 12A and 12B show operations of an output portion in an input device of one embodiment of the present invention.

Figure 2B:
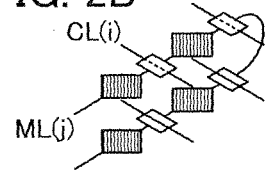
Figure 2C:
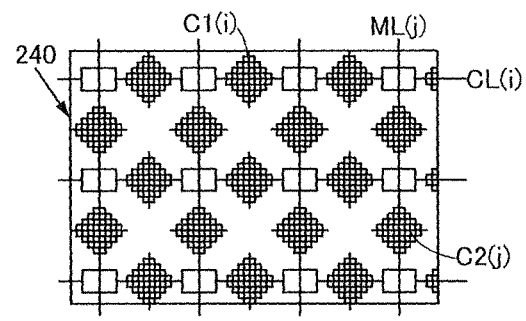
Figure 2D:
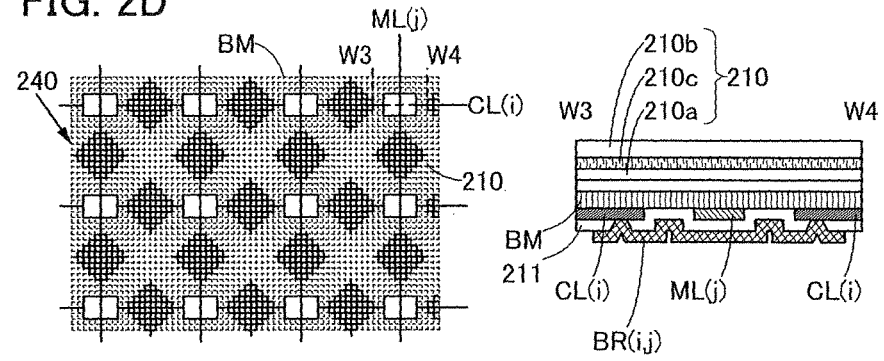
Figure 3:
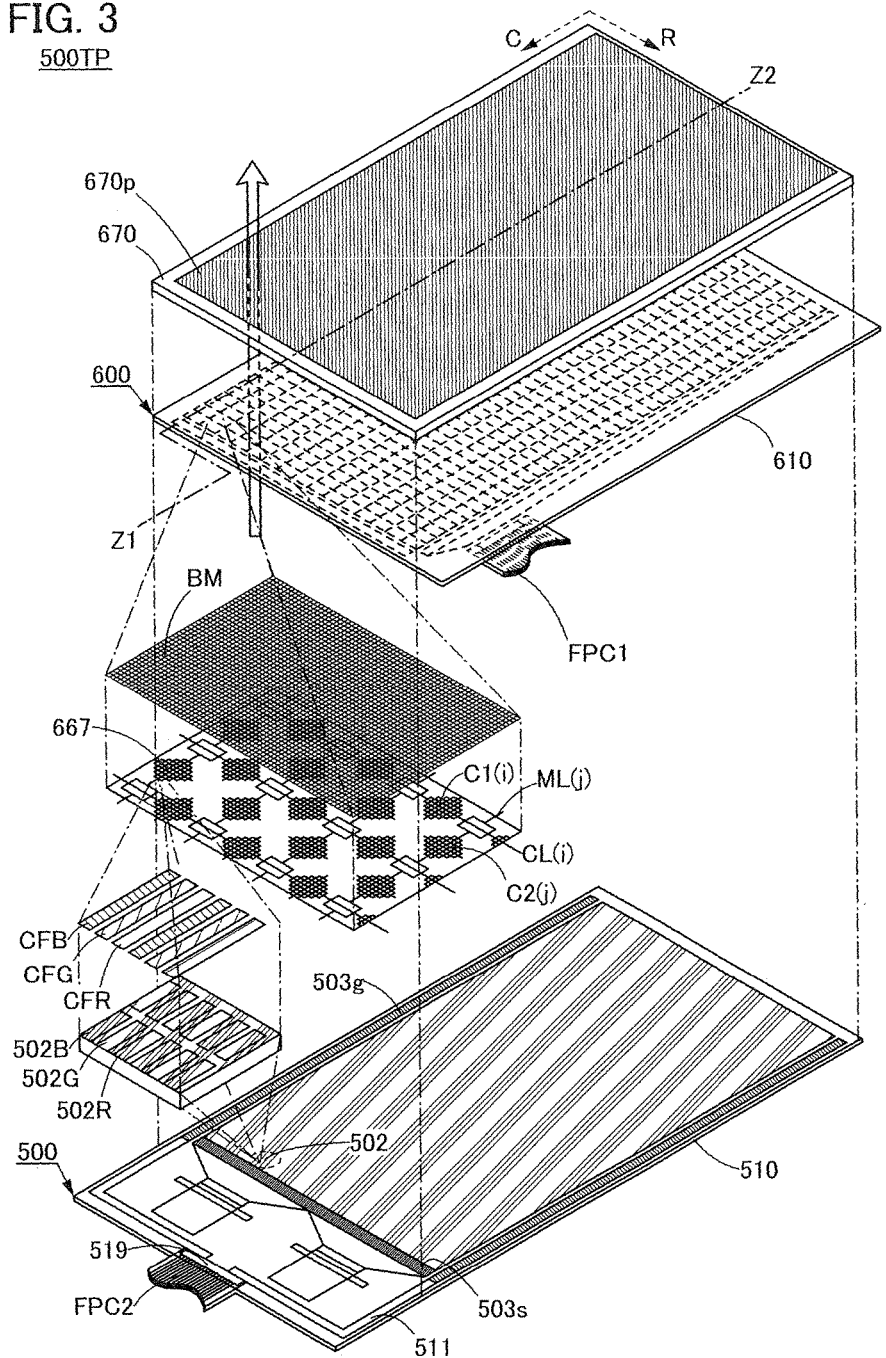

FIGS. 1A1 to 1A3 are projection views illustrating the input device 200 of one embodiment of the present invention. Specifically, FIG. 1A1 illustrates a sensor panel 240 in an unfolded state, FIG. 1A3 illustrates the sensor panel 240 in a folded state, and FIG. 1A2 illustrates the sensor panel 240 in an intermediate state between the folded state and the unfolded state.

FIG. 1B is a block diagram illustrating a structure of the input device 200.

<Structure Example 1 of Input Device>

The input device 200 described in this embodiment includes the sensor panel 240, a fold sensing portion 220, a control portion 203C, an output portion 203D, and a housing 290 (see FIGS. 1A1, 1A2, 1A3, and 1B).

The sensor panel 240 is supplied with a control signal and supplies a sensing signal, and can be folded and unfolded (see FIGS. 1A1 to 1A3).

The fold sensing portion 220 can sense the folded state and the unfolded state of the sensor panel 240, and can supply folding information including information showing the folded state or the unfolded state.

The control portion 203C can supply the control signal (see FIG. 1B).

The output portion 203D can be supplied with the sensing signal and the folding information, and can supply sensing information on the basis of the sensing signal and the folding information.

The housing 290 enables the sensor panel 240 to be folded and unfolded (see FIGS. 1A1 to 1A3).

The sensor panel 240 includes a control line CL(1) to a control line CL(m), a signal line ML(1) to a signal line ML(n), and a flexible base 210 (see FIG. 1B). Note that n is a natural number of 1 or more, and in is a natural number of 2 or more.

The control line is supplied with the control signal and extends in the row direction denoted by an arrow R in FIG. 1B.

The signal line extends in the column direction denoted by an arrow C in FIG. 1B and supplies the sensing signal.

The base 210 supports the control line and the signal line.

A part of one signal line ML(j) is placed to face another part of the signal line ML(j) in the folded state (see FIG. 2B). Note that j is a natural number of n or less.

In addition, the sensor panel 240 of the input device 200 in one embodiment of the present invention includes a first electrode C1(1) to a first electrode C1(m), a second electrode C2(1) to a second electrode C2(n), and the base 210.

A first electrode C1(i) is electrically connected to one control line CL(i). Note that i is a natural number of m or less.

A second electrode C2(j) is electrically connected to one signal line ML(j) and has a portion that does not overlap with the first electrodes C1(1) to C1(m).

The base 210 supports the first electrode and the second electrode.

A part of the second electrode C2(j) is placed to face another part of the second electrode C2(j) in the folded state (see FIG. 2B). A part of the first electrode C1 is folded in the folded state of the sensor panel (see FIG. 1B).

The input device 200 described in this embodiment includes the sensor panel 240, the housing 290 that enables the sensor panel 240 to be folded, and the fold sensing portion 220 that senses the folded state of the sensor panel 240 and supplies folding information. The sensor panel 240 includes the signal lines ML(1) to ML(n) that extend in the column direction. A part of one signal line ML(j) is placed to face another part of the signal line ML(j) in the folded state. Thus, electrodes whose potentials are substantially equal to each other are placed to face each other on one signal line, and an increase in parasitic capacitance of the signal line in the folded state can be suppressed. Moreover, sensing information based on the folding information and electrostatic capacitance that is changed when a sensing target such as a finger approaches or is in contact with the control line or the signal line can be supplied together with positional information of the control line and the signal line. Consequently, a novel input device that is highly convenient or reliable can be provided.

Furthermore, the housing 290 of the input device 200 includes a housing 290(1), a housing 290(2), and a housing 290(3) (see FIG. 1A1).

The housing 290 supports the sensor panel 240. The housing 290(1), the housing 290(2), and the housing 290(3) support a region 240(1), a region 240(2), and a region 240(3) of the sensor panel 240, respectively.

The housing 290(2) is connected rotatably to the housing 290(1) with a hinge. Furthermore, the housing 290(2) is connected rotatably to the housing 290(3) with another hinge. Thus, the housing 290 enables the sensor panel 240 to be folded like a folding screen along dashed line X1-X2 and dashed line Y1-Y2.

In this embodiment, a structure in which two fold lines are formed in the sensor panel 240, and the housing 290 enables the sensor panel 240 to be folded to divide the sensor panel into three regions is described; however, one embodiment of the present invention is not limited thereto. A structure in which s fold lines are formed in the sensor panel and the housing enables the sensor panel to be folded to divide the sensor panel into s+1 regions may be employed. Note that s is a natural number of 1 or more.

Individual components included in the input device 200 are described below. Note that these components cannot be clearly distinguished and one component also serves as another component or include part of another component in some cases.

«Overall Structure»

The input device of one embodiment of the present invention includes the sensor panel 240, the fold sensing portion 220, the control portion 203C, the output portion 203D, and the housing 290.

«Sensor Panel»

The sensor panel 240 includes the control line CL(1) to the control line CL(m), the signal line ML(1) to the signal line ML(n), and the flexible base 210.

«Wiring, First Electrode, and Second Electrode»

The control lines CL(1) to CL(m) can be supplied with and supply a modulated control signal.

The signal lines ML(1) to ML(n) can sense and supply a sensing signal.

The control signal supplied by the control line is sensed as a sensing signal by the signal line through a capacitor formed between the signal line and the control line.

In the case where the signal line and the control line are formed using conductive films that are formed in the same process, one wiring is formed to be divided at the intersection portion of the control line and the signal line. Then, an insulating film is provided at the intersection portion, and with another conductive film that is provided such that the insulating film is located between the other wiring and the another conductive film, the divided wirings are electrically connected to each other.

For example, the control line CL(i) is formed to be divided, and the divided control lines CL(i) are electrically connected to each other with a conductive film BR(i,j). Note that an insulating film 211 is provided at an intersection portion of the conductive film BR(i,j) and the signal line ML(j) (see FIG. 2A).

In addition, a light-blocking layer BM may be provided between the signal line ML(j) and the base 210 and between the control line CL(i) and the base 210. The light-blocking layer BM can reduce the intensity of light entering the signal line or the control line from the base 210 side or the intensity of light reflected by the signal line ML(j) or the control line CL(i). Note that the light-blocking layer BM can include opening portions (see FIG. 2D).

Opening portions reaching the control lines CL(i) are formed in the insulating film 211, and the control lines CL(i) are electrically connected to the conductive film BR(i,j) in the opening portions.

Specifically, the control line CL(i) and the signal line ML(j) are formed using conductive films that are formed in the same process, and the control line CL(i) is divided at an intersection portion with the signal line ML(j). The divided control lines CL(i) are electrically connected to each other with the conductive film BR(i,j).

In addition, the first electrode C1(i) electrically connected to the control line CL(i) can be provided. With the first electrode C1(i), a finger or the like that approaches or is in contact with the sensor panel 240 can be easily sensed.

In addition, the second electrode C2(j) electrically connected to the signal line ML(j) can be provided. With the second electrode C2(j), a finger or the like that approaches or is in contact with the sensor panel 240 can be easily sensed.

For example, rectangular electrodes can be used as the first electrode C1(i) and the second electrode C2(j) (see FIG. 2A). When a light-transmitting conductive film is used, a light-transmitting sensor panel can be provided.

Alternatively, the rectangular first electrode C1(i) and the rectangular second electrode C2(j) each of which has opening portions to have a net-like shape can be used (see FIG. 2C or FIG. 2D). When a metal film or the like including opening portions is used, electric resistance can be reduced as compared with the case of using the light-transmitting conductive film. Thus, light-transmitting sensor panels with various sizes can be provided and sensing information can be supplied without depending on the sizes. For example, it is possible to provide the sensor panels with various sizes ranging from the one which can be used for a handheld type device to the one which can be used for an electric blackboard.

Various conductive materials can be used for the wirings, the first electrode C1(i), the second electrode C2(j), and the conductive film BR(i,j).

For example, an inorganic conductive material, an organic conductive material, a metal material, a conductive ceramic material, or the like can be used for the conductive films of the first electrode C1(i), the second electrode C2(j), and the conductive film BR(i,j).

Specifically, a metal element selected from aluminum, gold, platinum, silver, chromium, tantalum, titanium, molybdenum, tungsten, nickel, iron, cobalt, yttrium, zirconium, palladium, and manganese; an alloy including any of the above metal elements; an alloy including any of the above metal elements in combination; or the like can be used for the wiring. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a stacked-layer structure in which a titanium film is stacked over an aluminum film, a stacked-layer structure in which a titanium film is stacked over a titanium nitride film, a stacked-layer structure in which a tungsten film is stacked over a titanium nitride film, a stacked-layer structure in which a tungsten film is stacked over a tantalum nitride film, a stacked-layer structure in which a tungsten film is stacked over a tungsten nitride film, a stacked-layer structure in which two titanium films and an aluminum film between the titanium films are stacked, or the like can be used.

Specifically, a stacked-layer structure in which a film of an element selected from titanium, tantalum, tungsten, molybdenum, chromium, neodymium, and scandium, an alloy film containing a plurality of elements selected from these elements, or a film containing a nitride of an element selected from these elements is stacked over an aluminum film can be used.

Alternatively, a conductive oxide such as indium oxide, indium tin oxide, indium zinc oxide, zinc oxide, or zinc oxide to which aluminum or gallium is added can be used for the conductive films.

Alternatively, graphene or graphite can be used for the conductive films. The film containing graphene can be formed, for example, by reducing a film containing graphene oxide. As a reducing method, a method using heat, a method using a reducing agent, or the like can be employed.

Alternatively, a conductive polymer can be used for the conductive films.

«Base»

There is no particular limitation on the base 210 as long as the base 210 has heat resistance high enough to withstand a manufacturing process and a thickness and a size which can be used in a manufacturing apparatus. In particular, use of a flexible material as the base 210 enables the input device 200 to be folded or unfolded.

For the base 210, an organic material, an inorganic material, a composite material of an organic material and an inorganic material, or the like can be used.

For example, an inorganic material such as glass, a ceramic, or a metal can be used for the base 210.

Specifically, non-alkali glass, soda-lime glass, potash glass, crystal glass, or the like can be used for the base 210.

Specifically, a metal oxide film, a metal nitride film, a metal oxynitride film, or the like can be used for the base 210. For example, silicon oxide, silicon nitride, silicon oxynitride, an alumina film, or the like can be used for the base 210.

For example, an organic material such as a resin, a resin film, or plastic can be used for the base 210.

Specifically, a resin film or resin plate of polyester, polyolefin, polyamide, polyimide, polycarbonate, an acrylic resin, or the like can be used for the base 210.

For example, a composite material such as a resin film to which a thin glass plate or a film of an inorganic material is attached can be used as the base 210.

For example, a composite material formed by dispersing a fibrous or particulate metal, glass, inorganic material, or the like into a resin film can be used as the base 210.

For example, a composite material formed by dispersing a fibrous or particulate resin, organic material, or the like into an inorganic material can be used as the base 210.

A single-layer material or a stacked-layer material in which a plurality of layers are stacked can be used for the base 210. For example, a stacked-layer material including a base and an insulating layer that prevents diffusion of impurities contained in the base can be used for the base 210.

Specifically, a stacked-layer material in which glass and one or a plurality of films that prevent diffusion of impurities contained in the glass and that are selected from a silicon oxide film, a silicon nitride film, a silicon oxynitride film, and the like are stacked can be used for the base 210.

Alternatively, a stacked-layer material in which a resin and a film that prevents diffusion of impurities contained in the resin, such as a silicon oxide film, a silicon nitride film, a silicon oxynitride film, and the like are stacked can be used for the base 210. For example, a material with a vapor permeability of lower than or equal to $10^{-5}$ g/(m$^2$·day), preferably lower than or equal to $10^{-6}$ g/(m$^2$·day) can be favorably used.

Specifically, a stack including a base 210b having flexibility, a barrier film 210a inhibiting diffusion of impurities, and a resin layer 210c attaching the base 210b to the barrier film 210a can be used (see FIG. 2A).

«Fold Sensing Portion»

The fold sensing portion 220 can sense the folded state and the unfolded state of the sensor panel 240. In addition, the fold sensing portion 220 can supply information showing the folded state or the unfolded state of the sensor panel 240 (see FIG. 1A1).

The fold sensing portion can include a sign and a sensor, for example.

Specifically, a structure such as a protrusion can be used as the sign and a switch or the like provided to sense the presence or absence of the structure can be used for the sensor. Alternatively, light can be used as the sign and a photoelectric conversion element or the like can be used for the sensor. Alternatively, an electric wave can be used as the sign and a coil or the like can be used for the sensor. Alternatively, a magnetic force can be used as the sign and a magnetic sensor or the like can be used for the sensor.

For example, for the information showing the folded state or the unfolded state of the sensor panel 240, a high or low potential can be used.

«Control Portion»

The control portion 203C supplies a control signal. For example, the control portion 203C supplies a control signal to each control line CL(i) sequentially. Alternatively, a plurality of signals modulated by a method in which the output portion 203D can separate the signals are supplied to the plurality of control lines selected from the control lines CL(1) to CL(m) at the same time.

When an object having a dielectric constant higher than that of the air, such as a finger, approaches a conductive film serving as the control line CL(i), the first electrode C1(i) electrically connected to the control line CL(i), or the like in the air, electrostatic capacitance between the finger and the conductive film changes. Then, a sensing signal is changed on the basis of a control signal and a change in electrostatic capacitance due to the object approaching the conductive film. Furthermore, when a finger or the like approaches a conductive film serving as the signal line ML(j), the second electrode C2(j) electrically connected to the signal line ML(j), or the like, electrostatic capacitance between the finger and the conductive film also changes.

«Output Portion»

The output portion 203D is supplied with the sensing signal and the folding information and determines a threshold value on the basis of the folding information. Approach or contact of a finger or the like can be sensed depending on whether a change of the sensing signal exceeds the threshold value or not.

The signal line ML(j) of the sensor panel 240 overlaps with other wirings in the folded state. Thus, the capacitance of the signal line ML(j) is larger than that of the signal line ML(j) in the unfolded state.

For example, when the folding information showing the folded state of the sensor panel 240 is supplied to the output portion 203D, the output portion 203D uses a value TH2 smaller than a value TH1, which is used in the case where the folding information showing the unfolded state is supplied, as a threshold value (see FIGS. 12A and 12B).

In this manner, by selecting an appropriate threshold value on the basis of the folding information, approach or contact of a sensing target such as a finger can be sensed appropriately even when the sensor panel 240 is folded or unfolded. Threshold values of respective pieces of folding information are stored in a memory portion of the output portion 203D, and the plurality of threshold values can be separately used by referring to the pieces of folding information.

For example, the amplitude of the sensing signal is changed on the basis of a control signal and a change in electrostatic capacitance due to the sensing object such as a finger. In the output portion 203D, it can be found whether or not a finger or the like approaches the control line CL(i), the first electrode C1(i), the signal line ML(j), or the second electrode C2(j) depending on whether a change in amplitude of the sensing signal exceeds the threshold value or not. FIG. 12A shows a control signal supplied to the sensor panel 240 in the unfolded state and a sensing signal sensed by the signal line ML(j). FIG. 12B shows a control signal supplied to the sensor panel 240 in the folded state and a sensing signal sensed by the signal line ML(j). Note that the dashed lines indicate sensing signals sensed in the state where the sensing object such as a finger approaches or is in contact with the sensor panel, and the solid lines indicate sensing signals sensed in the state where the sensing object such as a finger does not approach or is not in contact with the sensor panel.

When the sensor panel 240 is folded, the capacitance of the signal line ML(j) is increased. Thus, the amplitude of the sensing signal that is changed on the basis of the control signal in the state where the sensing object such as a finger approaches or is in contact with the sensor panel. Therefore, when the threshold value (value TH2) smaller than the threshold value used in the unfolded state (value TH1) is used in the output portion 203D, the approach or contact of the sensing object such as a finger or the like can be sensed (see FIGS. 12A and 12B).

«Housing»

The housing 290 enables the sensor panel 240 to be folded and unfolded.

For example, the sensor panel 240 can be folded such that a fold line is formed at the predetermined position. Specifically, the sensor panel 240 can be folded such that a valley fold line is formed along dashed line X1-X2. Furthermore, the sensor panel 240 can be folded such that a mountain fold line is formed along dashed line Y1-Y2 (see FIGS. 1A1, 1A2, 1A3, and 1B).

In the state where the sensor panel is folded, a part of one signal line ML(j) is placed to face another part of the signal line ML(j) (see FIG. 2B).

For example, when the sensor panel 240 is folded such that the valley fold line is formed along the dashed line X1-X2, the signal line ML(j) in the region 240(3) of the sensor panel 240 is placed to face the signal line ML(j) in the region 240(2) of the sensor panel 240. The sensor panel 240 is curved, at the fold line, with a curvature radius of 10 mm or less, preferably 8 mm or less, further preferably 5 mm or less, further preferably 4 mm or less.

In the case where the signal line ML(j) is divided into two portions and an area of one portion is smaller than or equal to an area of the other portion, 60% or higher of the area of the one portion preferably faces the other portion, 70% or higher of the area of the one portion further preferably faces the other portion, and 80% or higher of the area of the one portion further preferably faces the other portion. In the case where the second electrode C2(j) is electrically connected to the signal line ML(j), the area of the second electrode C2(j) is included in the area of the signal line ML(j).

Furthermore, the potential of the signal line ML(j) in the region 240(1) is substantially equal to the potential of the signal line ML(j) in the region 240(2); thus, the signal line ML(j) is folded such that the signal line ML(j) in the region 240(1) and the signal line ML(j) in the region 240(2) face each other, whereby an increase in capacitance of the signal line ML(j) due to a change from the unfolded state to the folded state can be suppressed. As a result, a difference between the degree of electrical interference generated on the signal line in the folded state and the degree of electrical interference generated on the signal line in the unfolded state becomes small, and a sensor panel that operates without depending on the state of the sensor panel can be provided.

<Structure Example 2 of Input Device>

Another structure of the input device of one embodiment of the present invention is described.

An input device described here is different from the above input device in including a control portion that can supply control signals modulated by different methods to respective control lines. Different parts of structures are described in detail below, and the above description is referred to for the other similar parts of structures.

The control lines include a first control line CL(p) and a second control line CL(q). Note that p and q are integers of m or less, and q is different from p.

The signal line includes the signal line ML(j) that intersects with the first control line CL(p) and the second control line CL(q).

The control portion 203C has a function of supplying a first control signal modulated by a first method to the first control line CL(p) and a function of supplying a second control signal modulated by a second method that is different from the first method to the second control line CL(q).

The output portion 203D is electrically connected to the signal line ML(j), and has a function of separating a first sensing signal based on the first control signal and a second sensing signal based on the second control signal from sensing signals supplied to the signal line ML(j).

In one embodiment of the invention described in the structure example 2 of the input device in this embodiment, a control portion that can supply control signals modulated by different methods to respective control lines and an output portion in which a sensing signal that is changed on the basis of electrostatic capacitance and the control signals modulated by different methods can be separated from sensing signals supplied to one signal line according to the modulation methods of the control signals. With such a structure, control signals are supplied to the first control line and the second control line at substantially the same time, and sensing signals sensed at a portion at which the first control line intersects with the signal line and at a portion at which the second control line intersects with the signal line can be separated from sensing signals supplied to the signal line. Consequently, a novel input device that is highly convenient or reliable can be provided.

For example, a control signal that can be separated from the first control signal may be used as the second control signal. Specifically, a signal having a first frequency can be used as the first control signal, and a signal having a second frequency, which is different from the first frequency, can be used as the second control signal.

<Structure Example 3 of Input Device>

Another structure of the input device of one embodiment of the present invention is described.

An input device described here is different from the above input device in that a control portion that can supply control signals modulated by different methods to respective adjacent control lines is included and the output portion 203D supplies sensing information by using a difference between sensing signals supplied from adjacent signal lines. Different parts of structures are described in detail below, and the above description is referred to for the other similar parts of structures.

The control lines include a first control line CL(p) and a second control line CL(q).

The signal line includes the signal line ML(j) that intersects with the first control line CL(p) and the second control line CL(q).

The signal line includes the signal line ML(j+1) that intersects with the first control line CL(p) and the second control line CL(q).

The control portion 203C has a function of supplying a first control signal modulated by a first method to the first control line CL(p) and a function of supplying a second control signal modulated by a second method that is different from the first method to the second control line CL(q).

The output portion 203D is electrically connected to the signal lines ML(j) and ML(j+1).

The output portion 203D has a function of separating a first sensing signal based on the first control signal and a second sensing signal based on the second control signal from sensing signals supplied to the signal line ML(j).

In addition, the output portion 203D has a function of separating a third sensing signal based on the first control signal and a fourth sensing signal based on the second control signal from sensing signals supplied to the signal line ML(j+1).

Furthermore, the output portion 203D has a function of supplying first sensing information based on a difference between the first sensing signal and the third sensing signal, which are compared with each other, and second sensing information based on a difference between the second sensing signal and the fourth sensing signal, which are compared with each other.

In one embodiment of the invention described in the structure example 3 of the input device in this embodiment, the control portion 203C that can supply control signals modulated by different methods to respective control lines and the output portion 203D in which a sensing signal that is changed on the basis of electrostatic capacitance and the control signals modulated by different methods can be separated from sensing signals supplied to one signal line ML(j) according to the modulation methods of the control signals. Furthermore, the output portion 203D can compare a sensing signal sensed by the signal line ML(j) with a sensing signal sensed by the signal line ML(j+1) that is adjacent to the signal line ML(j) to supply sensing information.

With such a structure, control signals are supplied to the first control line and the second control line at substantially the same time, and sensing signals sensed at a portion at which the first control line intersects with the signal line and at a portion at which the second control line intersects with the signal line can be separated from sensing signals supplied to the signal line. Furthermore, sensing information in which noise components are canceled depending on the adjacent sensing information can be supplied. Consequently, a novel input device that is highly convenient or reliable can be provided.

This embodiment can be combined with any of the other embodiments in this specification as appropriate.

(Embodiment 2)

In this embodiment, a structure of an input/output device that can be used for the sensor panel of the input device in one embodiment of the present invention are described with reference to FIG. 3 and FIGS. 4A to 4C.

FIG. 3 is a projection view illustrating a structure of an input/output device 500TP of one embodiment of the present invention. Note that for convenience of description, part of a sensor panel 600 and part of a pixel 502 are enlarged.

Figure 4A:
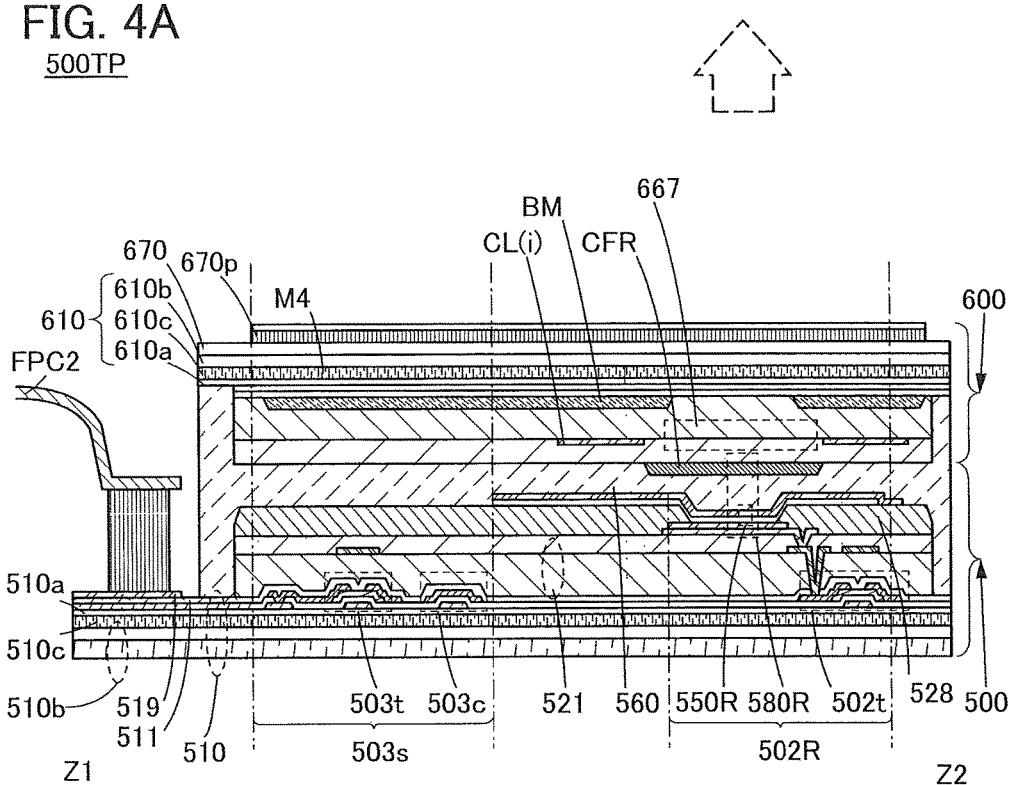
FIGS. 4A to 4C are cross-sectional views illustrating structures of an input/output device of one embodiment.
Figure 4B:
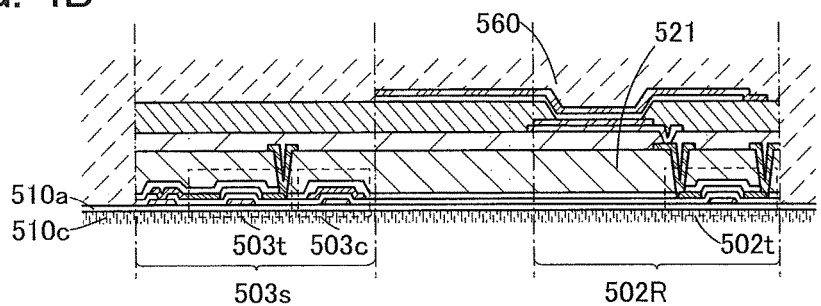
Figure 4C:
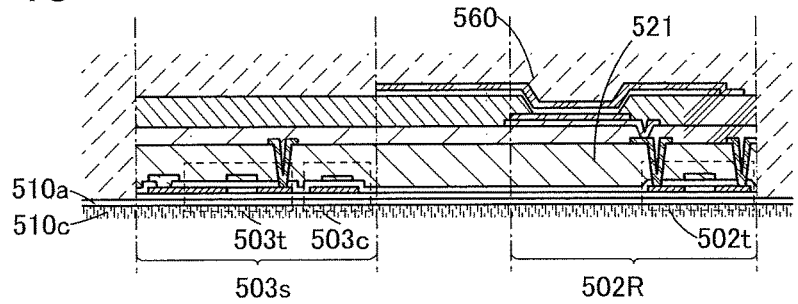

FIG. 4A is a cross-sectional view illustrating a part of the input/output device 500TP of one embodiment of the present invention along line Z1-Z2 in FIG. 3. FIGS. 4B and 4C are each a cross-sectional view illustrating a modification example of a part of the structure in FIG. 4A.

<Structure Example of Input Device>

The input/output device 500TP described in this embodiment includes a display portion 500 and the sensor panel 600 overlapping with the display portion 500 (see FIG. 3).

The sensor panel 600 can be supplied with a control signal and supply a sensing signal. Furthermore, the sensor panel 600 can be folded and unfolded.

The sensor panel 600 includes the plurality of control lines including the control line CL(i) supplied with a control signal and extending in the row direction. In addition, the plurality of signal lines including the signal line ML(j) extending in the column direction and supplying a sensing signal are included. Moreover, a flexible base 610 supporting the control line CL(i) and the signal line ML(j) is included.

A part of the signal line ML(j) is placed to face another part of the signal line ML(j) in the folded state.

Furthermore, the sensor panel 600 includes the first electrode C1(i) electrically connected to the control line CL(i) and the second electrode C2(j) electrically connected to the signal line ML(j) and including a portion not overlapping with the first electrode C1(i).

The base 610 supports the first electrode C1(i) and the second electrode C2(j).

A part of the second electrode C2(j) is placed to face another part of the second electrode C2(j) in the folded state.

The display portion 500 includes pixels 502.

The first electrode C1(i) or the second electrode C2(j) includes a net-like conductive film having opening portions 667 at positions overlapping with the pixels 502.

The input/output device 500TP described in this embodiment includes the sensor panel 600 and the display portion 500 that overlaps with the sensor panel 600 and can be folded and unfolded together with the sensor panel 600. A first electrode or a second electrode includes a net-like conductive film having opening portions at positions overlapping with the pixels of the display portion. Thus, the first electrode or the second electrode of the sensor panel having a small thickness with which the sensor panel can be folded or unfolded can reduce the degree of capacitive coupling with various conductive films and the like included in the display portion. Consequently, a novel input device that is highly convenient or reliable can be provided.

For example, the sensor panel 600 of the input/output device 500TP can sense sensing information and supply the sensing information together with the positional information. Specifically, a user of the input/output device 500TP can make various gestures (e.g., tap, drag, swipe, and pinch in) using his/her finger or the like that approaches or is in contact with the sensor panel 600 as a pointer.

The sensor panel 600 is capable of sensing approach or contact of a finger or the like to the sensor panel 600 and supplying sensing information including the obtained position, track, or the like.

An arithmetic unit judges whether or not supplied information satisfies a predetermined condition on the basis of a program or the like and executes instructions associated with a predetermined gesture.

Thus, a user of the sensor panel 600 can make the predetermined gesture and make the arithmetic unit execute instructions associated with the predetermined gesture.

Furthermore, the arithmetic device supplies display information V, and the display portion 500 of the input/output device 500TP is supplied with the display information V, for example.

In addition to the above structure, the following structure can be included in the input/output device 500IP.

The sensor panel 600 of the input/output device 500TP may be electrically connected to a flexible printed board FPC1.

The display portion 500 of the input/output device 500TP may include a driver circuit 503g, a driver circuit 503s, a wiring 511, and a terminal 519. The display portion 500 may be electrically connected to a flexible printed board FPC2.

In addition, a protective layer 670 that prevents damage and protects the input/output device 500TP may be provided. For example, a ceramic coat layer or a hard coat layer can be used as the protective layer 670. Specifically, a layer containing aluminum oxide or a UV curable resin can be used. Furthermore, an antireflective layer 670p that reduces the intensity of external light which is reflected by the input/output device 500TP can be used. Specifically, a circularly polarizing plate can be used, for example.

Individual components included in the input/output device 500TP are described below. Note that these components cannot be clearly distinguished and one component also serves as another component or include part of another component in some cases.

For example, the sensor panel 600 including the coloring layers overlapping the plurality of opening portions 667 also serves as a color filter.

For example, the input/output device 500TP where the sensor panel 600 overlaps with the display portion 500 serves as the sensor panel 600 and the display portion 500. Note that the input/output device 500TP in which the sensor panel 600 overlaps with the display portion 500 is also referred to as a touch panel.

«Overall Structure»

The input/output device 500TP described in this embodiment includes the sensor panel 600 and the display portion 500.

An example of a method for manufacturing a stack that can be used for manufacturing the input/output device 500TP is described in detail in Embodiments 3 to 5.

«Sensor Panel»

The sensor panel 600 includes the control line CL(i), the signal line ML(j), and the base 610.

The sensor panel 600 may be formed by depositing films for forming the sensor panel 600 over the base 610 and processing the films.

Alternatively, the sensor panel 600 may be formed in such a manner that part of the sensor panel 600 is formed over another base, and the part is transferred to the base 610.

The sensor panel 600 senses an object which approaches or touches the sensor panel 600 and supplies a sensing signal. For example, the sensor panel 600 senses electrostatic capacitance, illuminance, magnetic force, an electric wave, a pressure, or the like and supplies information based on the obtained physical value. Specifically, a capacitor, a photoelectric conversion element, a magnetic sensor element, a piezoelectric element, a resonator, and the like can be used as a sensor element.

For example, the sensor panel 600 senses a change in electrostatic capacitance between the sensor panel 600 and an object that approaches or is in contact with the sensor panel 600.

Note that when an object which has a higher dielectric constant than the air, such as a finger, approaches the conductive film in the air, electrostatic capacitance between the finger and the conductive film changes. The change in the electrostatic capacitance can be sensed, and sensing information can be supplied. Specifically, a conductive film and a capacitor one electrode of which is connected to the conductive film can be used.

For example, distribution of charge occurs between the conductive film and the capacitor owing to the change in the electrostatic capacitance, so that the voltage the pair of electrodes of the capacitor is changed. The change in voltage can be used for a sensing signal.

«Wiring»

The sensor panel 600 includes wirings. The wirings include the control line CL(i), the signal line ML(j), and the like.

A conductive material can be used for the wirings and the like.

For example, an inorganic conductive material, an organic conductive material, metal, conductive ceramics, or the like can be used for the wiring.

Specifically, a metal element selected from aluminum, gold, platinum, silver, chromium, tantalum, titanium, molybdenum, tungsten, nickel, iron, cobalt, yttrium, zirconium, palladium, and manganese; an alloy including any of the above metal elements; an alloy including any of the above metal elements in combination; or the like can be used for the wiring. In particular, one or more elements selected from aluminum, chromium, copper, tantalum, titanium, molybdenum, and tungsten are preferably contained. In particular, an alloy of copper and manganese is suitably used in microfabrication with the use of wet etching.

Specifically, a stacked-layer structure in which a titanium film is stacked over an aluminum film, a stacked-layer structure in which a titanium film is stacked over a titanium nitride film, a stacked-layer structure in which a tungsten film is stacked over a titanium nitride film, a stacked-layer structure in which a tungsten film is stacked over a tantalum nitride film, a stacked-layer structure in which a tungsten film is stacked over a tungsten nitride film, a stacked-layer structure in which two titanium films and an aluminum film between the titanium films are stacked, or the like can be used.

Specifically, a stacked-layer structure in which a film of an element selected from titanium, tantalum, tungsten, molybdenum, chromium, neodymium, and scandium, an alloy film containing a plurality of elements selected from these elements, or a film containing a nitride of an element selected from these elements is stacked over an aluminum film can be used.

Alternatively, a conductive oxide such as indium oxide, indium tin oxide, indium zinc oxide, zinc oxide, or zinc oxide to which aluminum or gallium is added can be used.

Alternatively, graphene or graphite can be used. A film containing graphene can be formed, for example, by reducing a film containing graphene oxide. As a reducing method, a method with application of heat, a method using a reducing agent, or the like can be used.

Alternatively, a conductive high molecule can be used.

«Base»

There is no particular limitation on the base 610 as long as the base 610 has heat resistance high enough to withstand a manufacturing process and a thickness and a size which can be used in a manufacturing apparatus. In particular, use of a flexible material as the base 610 enables the sensor panel 600 to be folded or unfolded. Note that in the case where the sensor panel 600 is positioned on a side where the display portion 500 displays an image, a light-transmitting material is used as the base 610.

For the base 610, an organic material, an inorganic material, a composite material of an organic material and an inorganic material, or the like can be used.

For example, an inorganic material such as glass, a ceramic, or a metal can be used for the base 610.

Specifically, non-alkali glass, soda-lime glass, potash glass, crystal glass, or the like can be used for the base 610.

Specifically, a metal oxide film, a metal nitride film, a metal oxynitride film, or the like can be used for the base 610. For example, silicon oxide, silicon nitride, silicon oxynitride, an alumina film, or the like can be used for the base 610.

For example, an organic material such as a resin, a resin film, or plastic can be used for the base 610.

Specifically, a resin film or resin plate of polyester, polyolefin, polyamide, polyimide, polycarbonate, an acrylic resin, or the like can be used for the base 610.

For example, a composite material such as a resin film to which a thin glass plate or a film of an inorganic material is attached can be used as the base 610.

For example, a composite material formed by dispersing a fibrous or particulate metal, glass, inorganic material, or the like into a resin film can be used as the base 610.

For example, a composite material formed by dispersing a fibrous or particulate resin, organic material, or the like into an inorganic material can be used as the base 610.

A single-layer material or a stacked-layer material in which a plurality of layers are stacked can be used for the base 610. For example, a stacked-layer material including a base and an insulating layer that prevents diffusion of impurities contained in the base can be used for the base 610.

Specifically, a stacked-layer material in which glass and one or a plurality of films that prevent diffusion of impurities contained in the glass and that are selected from a silicon oxide film, a silicon nitride film, a silicon oxynitride film, and the like are stacked can be used for the base 610.

Alternatively, a stacked-layer material in which a resin and a film that prevents diffusion of impurities contained in the resin, such as a silicon oxide film, a silicon nitride film, a silicon oxynitride film, and the like are stacked can be used for the base 610.

Specifically, a stack including a base 610b having flexibility, a barrier film 610a inhibiting diffusion of impurities, and a resin layer 610c attaching the base 610b to the barrier film 610a can be used (see FIG. 4A).

«Flexible Printed Board»

The flexible printed circuit board FPC1 supplies a timing signal, a power supply potential, and the like, and is supplied with a sensing signal (see FIG. 3).

«Display Portion»

The display portion 500 includes the pixel 502, scan lines, signal lines, and a base 510.

Note that the display portion 500 may be formed in such a manner that films for forming the display portion 500 are deposited over the base 510 and the films are processed.

The display portion 500 may be formed in such a manner that part of the display portion 500 is formed over another base and the part is transferred to the base 510.

«Pixel»

The pixel 502 includes a sub-pixel 502B, a sub-pixel 502G, and a sub-pixel 502R, and each sub-pixel includes a display element and a pixel circuit for driving the display element.

«Pixel Circuit»

An active matrix method in which an active element is included in a pixel or a passive matrix method in which an active element is not included in a pixel can be employed for the display portion.

In an active matrix method, as an active element (a non-linear element), not only a transistor but also various active elements (non-linear elements) can be used. For example, an MIM (metal insulator metal), a TFD (thin film diode), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

The pixel circuit includes a transistor 502t, for example (see FIG. 4A).

The display portion 500 includes an insulating film 521 covering the transistor 502t. The insulating film 521 can be used as a layer for planarizing unevenness caused by the pixel circuit. A stacked-layer film including a layer that can prevent diffusion of impurities can be used as the insulating film 521. This can prevent the reliability of the transistor 502t or the like from being lowered by diffusion of unintentional impurities.

«Display Element»

Various display elements can be used for the display portion 500. For example, display elements (electronic ink) that perform display by an electrophoretic method, an electronic liquid powder (registered trademark) method, an electrowetting method, or the like, MEMS shutter display elements, optical interference type MEMS display elements, and liquid crystal elements can be used.

Alternatively, display elements which can be used for a transmissive liquid crystal display, a transflective liquid crystal display, a reflective liquid crystal display, a direct-view liquid crystal display, and the like can be used.

For example, organic electroluminescent elements that emit light of different colors may be included in sub-pixels.

For example, an organic electroluminescence element which emits white light can be used.

For example, a light-emitting element 550R includes a lower electrode, an upper electrode, and a layer containing a light-emitting organic compound between the lower electrode and the upper electrode.

The sub-pixel 502R includes a light-emitting module 580R. The sub-pixel 502R includes the light-emitting element 550R and the pixel circuit that can supply power to the light-emitting element 550R and includes the transistor 502t. Furthermore, the light-emitting module 580R includes the light-emitting element 550R and an optical element (e.g., the coloring layer CFR).

Note that to efficiently extract light having a certain wavelength, a microresonator structure may be provided in the light-emitting module 580R. Specifically, a layer containing a light-emitting organic compound may be provided between a film which reflects visible light which is provided to efficiently extract certain light and a semi-transmissive and semi-reflective film.

The light-emitting module 580R includes the coloring layer CFR on the light extraction side. The coloring layer transmits light of a particular wavelength and is, for example, the coloring layer CFR that selectively transmits light of red, a coloring layer CFG that selectively transmits light of green, a coloring layer CFB that selectively transmits light of blue, or a coloring layer that selectively transmits light of yellow or the like. Note that other sub-pixels may be provided so as to overlap with the window portions, which are not provided with the coloring layers, so that light from the light-emitting element can be emitted without passing through the coloring layers.

The coloring layer CFR is positioned in a region overlapping with the light-emitting element 550R. Accordingly, part of light emitted from the light-emitting element 550R passes through the coloring layer CFR and is emitted to the outside of the light-emitting module 580R as indicated by an arrow in FIG. 6A.

The light-blocking layer BM is located so as to surround the coloring layer (e.g., the coloring layer CFR).

Note that in the case where a sealant 560 is provided on a side from which light is extracted, the sealant 560 may be in contact with the light-emitting element 550R and the coloring layer CFR.

The lower electrode is provided over the insulating film 521. A partition 528 with an opening overlapping the lower electrode is provided. Note that part of the partition 528 overlaps an end portion of the lower electrode.

The lower electrode is included in the light-emitting element (e.g., the light-emitting element 550R); the layer containing a light-emitting organic compound is provided between the upper electrode and the lower electrode. The pixel circuit supplies power to the light-emitting element.

Over the partition 528, a spacer that controls the gap between the base 610 and the base 510 is provided.

In the case of a transflective liquid crystal display or a reflective liquid crystal display, some of or all of pixel electrodes function as reflective electrodes. For example, some or all of pixel electrodes are formed to contain aluminum, silver, or the like.

A memory circuit such as an SRAM can be provided under the reflective electrodes. Thus, the power consumption can be further reduced. A structure suitable for employed display elements can be selected from among a variety of structures of pixel circuits.

«Base»

A flexible material can be used for the base 510. For example, a material which is similar to the material that can be used for the base 610 can be used for the base 510.

Note that in the case where the base 510 need not have a light-emitting property, for example, a colored material, a material which does not have a light-emitting property, specifically, a resin colored with yellow or the like, SUS, aluminum, or the like, can be used.

A stack in which a flexible base 510b, a barrier film 510a that prevents diffusion of impurities, and a resin layer 510c that bonds the barrier film 510a to the base 510b are stacked can be favorably used for the base 510, for example (see FIG. 4A).

«Sealant»

The sealant 560 bonds the base 610 to the base 510. The sealant 560 has a refractive index higher than that of air. In the case of extracting light to the sealant 560 side, the sealant 560 preferably also serves as an optical adhesive layer. For example, when a material whose refractive index is higher than that of air, preferably a material whose refractive index is higher than or equal to 1.1, further preferably a material whose refractive index is higher than or equal to 1.2 is used for the sealant 560, the image can be clearly displayed.

Note that the pixel circuits and the light-emitting elements (e.g., a light-emitting element 550R) are provided between the base 510 and the base 610.

«Structure of Driver Circuit»

The driver circuit 503g supplies a selection signal. For example, the driver circuit 503g supplies a selection signal to the scan line (see FIG. 3).

In addition, the driver circuit 503s supplying an image signal may be provided. For example, a transistor 503t or a capacitor 503c can be used in the driver circuit 503s.

For example, a shift register, a flip flop circuit, a combination circuit, or the like can be used as the driver circuit 503g or the driver circuit 503s.

Note that transistors that can be formed in the same process and over the same substrate as those of the pixel circuit can be used in the driver circuit.

«Wiring»

The display portion 500 includes wirings such as scan lines, signal lines, and power supply lines. Various conductive films can be used. For example, a material similar to that of the conductive film that can be used in the sensor panel 600 can be used.

The display portion 500 includes the wiring 511 through which a signal can be supplied, and the terminal 519 is provided on the wiring 511. Note that the flexible printed substrate FPC2 through which a signal such as an image signal or a synchronization signal can be supplied is electrically connected to the terminal 519.

Note that a printed wiring board (PWB) may be attached to the flexible printed substrate FPC2.

«Other Component»

The input/output device 500TP includes the antireflective layer 670p positioned in a region overlapping with the pixel. As the antireflective layer 670p, a circular polarizing plate can be used, for example.

<Modification Example of Input/Output Device>

Various transistors can be used for the sensor panel 600 and/or the display portion 500.

A structure of the case of using bottom-gate transistors in the display portion 500 is illustrated in FIGS. 4A and 4B.

For example, a semiconductor layer containing an oxide semiconductor, amorphous silicon, or the like can be used in the transistor 502t and the transistor 503t illustrated in FIG. 4A.

For example, a semiconductor layer containing polycrystalline silicon that is obtained by crystallization process such as laser annealing can be used in the transistor 502t and the transistor 503t illustrated in FIG. 4B.

A structure in the case of using top-gate transistors in the display portion 500 is illustrated in FIG. 4C.

For example, a semiconductor layer containing polycrystalline silicon, a single crystal silicon film that is transferred from a single crystal silicon substrate, or the like can be used in the transistor 502t and the transistor 503t illustrated in FIG. 4C.

This embodiment can be combined with any of the other embodiments in this specification as appropriate.

(Embodiment 3)

In this embodiment, a method of manufacturing a stack that can be used in the manufacture of the sensor panel, input device, or input/output device of one embodiment of the present invention is described with reference to FIGS. 5A1 to 5E2.

FIGS. 5A1 to 5E2 are schematic views illustrating a process of manufacturing the stack. Cross-sectional views illustrating structures of a processed member and the stack are shown on the left side of FIGS. 5A1 to 5E2, and top views corresponding to the cross-sectional views except FIG. 5C are shown on the right side.

<Method of Manufacturing Stack>

A method of manufacturing a stack 81 from a processed member 80 is described with reference to FIGS. 5A1 to 5E2.

The processed member 80 includes a first substrate F1, a first separation layer F2 on the first substrate F1, a first layer F3 to be separated whose one surface is in contact with the first separation layer F2, a bonding layer 30 whose one surface is in contact with the other surface of the first layer F3 to be separated, and a base S5 in contact with the other surface of the bonding layer 30 (see FIGS. 5A1 and 5A2).

Note that a structure of the processed member 80 is described in detail in Embodiment 5.

«Formation of Separation Starting Points»

The processed member 80 in which separation starting points F3s are formed in the vicinity of edges of the bonding layer 30 is prepared.

The separation starting points F3s are formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

«First Step»

The processed member 80 in which the separation starting points F3s are formed in the vicinity of the edges of the bonding layer 30 in advance is prepared (see FIGS. 5B1 and 5B2).

«Second Step»

One surface layer 80b of the processed member 80 is separated. As a result, a first remaining portion 80a is obtained from the processed member 80.

Specifically, from the separation starting point F3s formed in the vicinity of the edge of the bonding layer 30, the first substrate F1, together with the first separation layer F2, is separated from the first layer F3 to be separated (see FIG. 5C). Consequently, the first remaining portion 80a including the first layer F3 to be separated, the bonding layer 30 whose one surface is in contact with the first layer F3 to be separated, and the base S5 in contact with the other surface of the bonding layer 30 is obtained.

The separation may be performed while the vicinity of the interface between the first separation layer F2 and the first layer F3 to be separated is irradiated with ions to remove static electricity. Specifically, the ions may be generated by an ionizer.

Furthermore, when the first layer F3 to be separated is separated from the first separation layer F2, a liquid is injected into the interface between the first separation layer F2 and the first layer F3 to be separated. Alternatively, a liquid may be ejected and sprayed by a nozzle 99. For example, as the injected liquid or the sprayed liquid, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the first separation layer F2, the first layer F3 to be separated is preferably separated while a liquid containing water is injected or sprayed because a stress applied to the first layer F3 to be separated due to the separation can be reduced.

«Third Step»

A first adhesive layer 31 is formed on the first remaining portion 80a (see FIGS. 5D1 and 5D2), and the first remaining portion 80a is bonded to a first support 41 with the first adhesive layer 31. Consequently, the stack 81 is obtained from the first remaining portion 80a.

Specifically, the stack 81 including the first support 41, the first adhesive layer 31, the first layer F3 to be separated, the bonding layer 30 whose one surface is in contact with the first layer F3 to be separated, and the base S5 in contact with the other surface of the bonding layer 30 is obtained (see FIGS. 5E1 and 5E2).

To form the bonding layer 30, any of a variety of methods can be used. For example, the bonding layer 30 can be formed with a dispenser, by a screen printing method, or the like. The bonding layer 30 is cured by a method selected depending on its material. For example, when a light curable adhesive is used for the bonding layer 30, light including light of a predetermined wavelength is emitted.

This embodiment can be combined with any of the other embodiments described in this specification as appropriate.

(Embodiment 4)

In this embodiment, a method of manufacturing a stack that can be used in the manufacture of the sensor panel, input device, or input/output device of one embodiment of the present invention is described with reference to FIGS. 6A1 to 6E2 and FIGS. 7A1 to 7E2.

FIGS. 6A1 to 6E2 and FIGS. 7A1 to 7E2 are schematic views illustrating a process of manufacturing the stack. Cross-sectional views illustrating structures of a processed member and the stack are shown on the left side of FIGS. 6A1 to 6E2 and FIGS. 7A1 to 7E2, and top views corresponding to the cross-sectional views except FIG. 6C and FIGS. 7B and 7C are shown on the right side.

<Method of Manufacturing Stack>

A method of manufacturing a stack 92 from a processed member 90 is described with reference to FIGS. 6A1 to 6E2 and FIGS. 7A1 to 7E2.

The processed member 90 is different from the processed member 80 in that the other surface of the bonding layer 30 is in contact with one surface of a second layer S3 to be separated instead of the material S5.

Specifically, the difference is that the second substrate S1 instead of the base S5, a second separation layer S2 over the second substrate S1, and the second layer S3 to be separated whose other surface is in contact with the second separation layer S2 are included, and that one surface of the second layer S3 to be separated is in contact with the other surface of the bonding layer 30.

In the processed member 90, the first substrate F1, the first separation layer F2, the first layer F3 to be separated whose one surface is in contact with the first separation layer F2, the bonding layer 30 whose one surface is in contact with the other surface of the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order (see FIGS. 6A1 and 6A2).

Note that a structure of the processed member 90 is described in detail in Embodiment 5.

«First Step»

The processed member 90 in which the separation starting points F3s are formed in the vicinity of the edges of the bonding layer 30 is prepared (see FIGS. 6B1 and 6B2).

The separation starting point F3s is formed by separating part of the first layer F3 to be separated, from the first substrate F1.

For example, part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

«Second Step»

One surface layer 90b of the processed member 90 is separated. As a result, a first remaining portion 90a is obtained from the processed member 90.

Figure 6C:
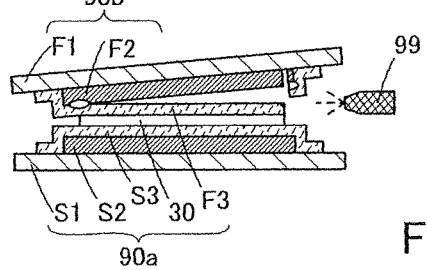

Specifically, from the separation starting point F3s formed in the vicinity of the edge of the bonding layer 30, the first substrate F1, together with the first separation layer F2, is separated from the first layer F3 to be separated (see FIG. 6C). Consequently, the first remaining portion 90a in which the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

«Third Step»

A first adhesive layer 31 is formed on the first remaining portion 90a (see FIGS. 6D1 and 6D2), and the first remaining portion 90a is bonded to a first support 41 with the first adhesive layer 31. Consequently, a stack 91 is obtained from the first remaining portion 90a.

Specifically, the stack 91 in which the first support 41, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained (see FIGS. 6E1 and 6E2).

«Fourth Step»

Part of the second layer S3 to be separated in the vicinity of the edge of the first adhesive layer 31 of the stack 91 is separated from the second substrate S1 to form a second separation starting point 91s.

For example, the first support 41 and the first adhesive layer 31 are cut from the first support 41 side, and part of the second layer S3 to be separated is separated from the second substrate S1 along an edge of the first adhesive layer 31 which is newly formed.

Specifically, the first adhesive layer 31 and the first support 41 in a region which is over the second separation layer S2 and in which the second layer S3 to be separated is provided are cut with a blade or the like including a sharp tip, and along a newly formed edge of the first adhesive layer 31, the second layer S3 to be separated is partly separated from the second substrate S1 (see FIGS. 7A1 and 7A2).

Consequently, the separation starting points 91s are formed in the vicinity of newly formed edges of the first support 41b and the first adhesive layer 31.

«Fifth Step»

A second remaining portion 91a is separated from the stack 91. As a result, the second remaining portion 91a is obtained from the stack 91 (see FIG. 7C).

Specifically, from the separation starting point 91s formed in the vicinity of the edge of the first adhesive layer 31, the second substrate S1, together with the second separation layer S2, is separated from the second layer S3 to be separated. Consequently, the second remaining portion 91a in which the first support 41b, the first adhesive layer 31, the first layer F3 to be separated, the bonding layer 30 whose one surface is in contact with the first layer F3 to be separated, and the second layer S3 to be separated whose one surface is in contact with the other surface of the bonding layer 30 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

«Sixth step»

A second adhesive layer 32 is formed on the second remaining portion 91a (see FIGS. 7D1 and 7D2).

The second remaining portion 91a is bonded to the second support 42 with the second adhesive layer 32. Consequently, a stack 92 is obtained from the second remaining portion 91a (see FIGS. 7E1 and 7E2).

Specifically, the stack 92 in which first support 41b, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second adhesive layer 32, and the second support 42 are placed in this order is obtained.

<Method of Manufacturing Stack Including Opening Portion in Support>

A method of manufacturing a stack including an opening portion in a support is described with reference to FIGS. 8A1 to 8D2.

FIGS. 8A1 to 8D2 illustrate the method of manufacturing a stack including an opening portion which exposes part of a layer to be separated in a support. Cross-sectional views illustrating structures of the stack are shown on the left side of FIGS. 8A1 to 8D2, and top views corresponding to the cross-sectional views are shown on the right side.

FIGS. 8A1 to 8B2 illustrate a method of manufacturing a stack 92c comprising an opening portion by using a second support 42b which is smaller than the first support 41b.

FIGS. 8C1 to 8D2 illustrate a method of manufacturing a stack 92d comprising an opening portion formed in the second support 42.

«Example 1 of Method of Manufacturing Stack Comprising Opening Portion in Support»

A method of manufacturing a stack has the same step as the above sixth step except that the second support 42b which is smaller than the first support 41b is used instead of the second support 42. By this method, a stack in which part of the second layer S3 to be separated is exposed can be manufactured (see FIGS. 8A1 and 8A2).

As the second adhesive layer 32, a liquid adhesive can be used. Alternatively, an adhesive whose fluidity is inhibited and which is formed in a single wafer shape in advance (also referred to as a sheet-like adhesive) can be used. By using the sheet-like adhesive, the amount of part of the adhesive layer 32 which extends beyond the second support 42b can be small. In addition, the adhesive layer 32 can have a uniform thickness easily.

Part of the exposed part of the second layer S3 to be separated is cut off, and the first layer F3 to be separated may be exposed (see FIGS. 8B1 and 8B2).

Specifically, with a blade or the like which has a sharp tip, a slit is formed in the exposed second layer S3 to be separated. Then, for example, an adhesive tape or the like is attached to part of the exposed second layer S3 to be separated to concentrate stress near the slit, and the part of the exposed second layer S3 to be separated is separated together with the attached tape or the like, whereby the part of the second layer S3 to be separated can be selectively removed.

Moreover, a layer which can suppress the bonding power of the bonding layer 30 to the first layer F3 to be separated may be selectively formed on part of the first layer F3 to be separated. For example, a material which is not easily bonded to the bonding layer 30 may be selectively formed. Specifically, an organic material may be deposited into an island shape. Thus, part of the bonding layer 30 can be selectively removed together with the second layer S3 to be separated easily. As a result, the first layer F3 to be separated can be exposed.

Note that for example, in the case where the first layer F3 to be separated includes a functional layer and a conductive layer F3b electrically connected to the functional layer, the conductive layer F3b can be exposed in an opening portion in the second stack 92c. Thus, the conductive layer F3b exposed in the opening portion can be used as a terminal supplied with a signal.

As a result, the conductive layer F3b part of which is exposed in the opening portion can be used as a terminal that can extract a signal supplied though the functional layer, or can be used as a terminal to which a signal supplied to the functional layer can be supplied by an external device.

«Example 2 of Method of Manufacturing Stack Comprising Opening Portion in Support»

A mask 48 comprising an opening portion formed to overlap with an opening portion formed in the second support 42 is formed on the stack 92. Next, a solvent 49 is dropped into the opening portion in the mask 48. Thus, with the solvent 49, the second support 42 exposed in the opening portion in the mask 48 can be swelled or dissolved (see FIGS. 8C1 and 8C2).

After the extra solvent 49 is removed, stress is applied by, for example, rubbing the second support 42 exposed in the opening portion in the mask 48. Thus, the second support 42 or the like in a portion overlapping with the opening portion in the mask 48 can be removed.

Moreover, with a solvent with which the bonding layer 30 is swelled or dissolved, the first layer F3 to be separated can be exposed (see FIGS. 8D1 and 8D2).

This embodiment can be combined with any of the other embodiments described in this specification as appropriate.

(Embodiment 5)

In this embodiment, a structure of a processed member that can be processed into the sensor panel, input device, or input/output device of one embodiment of the present invention is described with reference to FIGS. 9A1 to 9B2.

FIGS. 9A1 to 9B2 are schematic views illustrating a structure of a processed member that can be processed into the stack.

FIG. 9A1 is a cross-sectional view illustrating a structure of the processed member 80 which can processed into the stack, and FIG. 9A2 is a top view corresponding to the cross-sectional view.

FIG. 9B 1 is a cross-sectional view illustrating a structure of the processed member 90 which can processed into the stack, and FIG. 9B2 is a top view corresponding to the cross-sectional view.

<Structure Example 1 of Processed Member>

The processed member 80 includes a first substrate F1, the first separation layer F2 on the first substrate F1, the first layer F3 to be separated whose one surface is in contact with the first separation layer F2, the bonding layer 30 whose one surface is in contact with the other surface of the first layer F3 to be separated, and the base S5 in contact with the other surface of the bonding layer 30 (see FIGS. 9A1 and 9A2).

Note that the separation starting points F3s may be formed in the vicinity of the edges of the bonding layer 30.

«First Substrate»

There is no particular limitation on the first substrate F1 as long as it has heat resistance high enough to withstand a manufacturing process and a thickness and a size which can be used in a manufacturing apparatus.

For the first substrate F1, an organic material, an inorganic material, a composite material of an organic material and an inorganic material, or the like can be used.

For example, an inorganic material such as glass, ceramic, or metal, can be used for the first substrate F1.

Specifically, non-alkali glass, soda-lime glass, potash glass, crystal glass, or the like can be used for the first substrate F1.

Specifically, a metal oxide film, a metal nitride film, a metal oxynitride film, or the like can be used for the first substrate F1. For example, silicon oxide, silicon nitride, silicon oxynitride, an alumina film, or the like can be used for the first substrate F1.

Specifically, SUS, aluminum, or the like can be used for the first substrate F1.

For example, an organic material such as a resin, a resin film, or a plastic can be used for the first substrate F1.

Specifically, a resin film or a resin plate of polyester, polyolefin, polyamide, polyimide, polycarbonate, an acrylic resin, or the like can be used for the first substrate F1.

For example, a composite material such as a resin film to which a metal plate, a thin glass plate, or a film of an inorganic material is attached can be used as the first substrate F1.

For example, a composite material formed by dispersing a fibrous or particulate metal, glass, inorganic material, or the like into a resin film can be used as the first substrate F1.

For example, a composite material formed by dispersing a fibrous or particulate resin, organic material, or the like into an inorganic material can be used as the first substrate F1.

For the first substrate F1, a single-layer material or a stacked-layer material in which a plurality of layers are stacked can be used. For example, a stacked-layer material in which a base, an insulating layer that prevents diffusion of impurities contained in the base, and the like are stacked can be used for the first substrate F1.

Specifically, a stacked-layer material in which glass and one or a plurality of films that prevents diffusion of impurities contained in the glass and that are selected from a silicon oxide film, a silicon nitride film, a silicon oxynitride film, and the like are stacked can be used for the first substrate F1.

Alternatively, a stacked-layer material in which a resin and a film that prevents diffusion of impurities contained in the resin, such as a silicon oxide film, a silicon nitride film, and a silicon oxynitride film are stacked can be used for the first substrate F1.

«First Separation Layer»

The first separation layer F2 is provided between the first substrate F1 and the first layer F3 to be separated. In the vicinity of the first separation layer F2, a boundary where the first layer F3 to be separated can be separated from the first substrate F1 is formed. There is no particular limitation on the first separation layer F2 as long as it has heat resistance high enough to withstand the manufacturing process of the first layer F3 to be separated formed thereon.

For the first separation layer F2, for example, an inorganic material, an organic resin, or the like can be used.

Specifically, an inorganic material such as a metal containing an element selected from tungsten, molybdenum, titanium, tantalum, niobium, nickel, cobalt, zirconium, zinc, ruthenium, rhodium, palladium, osmium, iridium, and silicon, an alloy containing the element, or a compound containing the element can be used for the first separation layer F2.

Specifically, an organic material such as polyimide, polyester, polyolefin, polyamide, polycarbonate, or an acrylic resin can be used.

For example, a single-layer material or a stacked-layer material in which a plurality of layers are stacked can be used for the first separation layer F2.

Specifically, a material in which a layer containing tungsten and a layer containing an oxide of tungsten are stacked can be used for the first separation layer F2.

The layer containing an oxide of tungsten can be formed by a method in which another layer is stacked on a layer containing tungsten. Specifically, the layer containing an oxide of tungsten may be formed by a method in which silicon oxide, silicon oxynitride, or the like is stacked on a layer containing tungsten.

The layer containing an oxide of tungsten may be formed by subjecting a surface of a layer containing tungsten to thermal oxidation treatment, oxygen plasma treatment, nitrous oxide ($N_2O$) plasma treatment, treatment with a solution with high oxidizing power (e.g., ozone water), or the like.

Specifically, a layer containing polyimide can be used as the first separation layer F2. The layer containing polyimide has heat resistance high enough to withstand the various manufacturing steps required to form the first layer F3 to be separated.

For example, the layer containing polyimide has heat resistance of 200° C. or higher, preferably 250° C. or higher, more preferably 300° C. or higher, still more preferably 350° C. or higher.

By heating a film containing a monomer formed on the first substrate F1, a film containing polyimide obtained by condensation of the monomer can be used.

«First Layer to be Separated»

There is no particular limitation on the first layer F3 to be separated as long as it can be separated from the first substrate F1 and has heat resistance high enough to withstand the manufacturing process.

The boundary where the first layer F3 to be separated can be separated from the first substrate F1 may be formed between the first layer F3 to be separated and the first separation layer F2 or may be formed between the first separation layer F2 and the first substrate F1.

In the case where the boundary is formed between the first layer F3 to be separated and the first separation layer F2, the first separation layer F2 is not included in the stack. In the case where the boundary is formed between the first separation layer F2 and the first substrate F1, the first separation layer F2 is included in the stack.

An inorganic material, an organic material, a single-layer material, a stacked-layer material in which a plurality of layers are stacked, or the like can be used for the first layer F3 to be separated.

For example, an inorganic material such as a metal oxide film, a metal nitride film, or a metal oxynitride film can be used for the first layer F3 to be separated.

Specifically, silicon oxide, silicon nitride, silicon oxynitride, an alumina film, or the like can be used for the first layer F3 to be separated.

Specifically, a resin, a resin film, plastic, or the like can be used for the first layer F3 to be separated.

Specifically, a polyimide film or the like can be used for the first layer F3 to be separated.

For example, a material having a structure in which a functional layer overlapping with the first separation layer F2 and an insulating layer that is provided between the first separation layer F2 and the functional layer and can prevent diffusion of impurities which impairs the function of the functional layer are stacked can be used.

Specifically, a 0.7-mm-thick glass plate is used as the first substrate. F1, and a stacked-layer material in which a 200-nm-thick silicon oxynitride film and a 30-nm-thick tungsten film are stacked in this order from the first substrate F1 side is used for the first separation layer F2. In addition, a film including a stacked-layer material in which a 600-nm-thick silicon oxynitride film and a 200-nm-thick silicon nitride film are stacked in this order from the first separation layer F2 side can be used as the first layer F3 to be separated. Note that a silicon oxynitride film refers to a film that includes more oxygen than nitrogen, and a silicon nitride oxide film refers to a film that includes more nitrogen than oxygen.

Specifically, instead of the above first layer F3 to be separated, a film including a stacked-layer material of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film stacked in this order from the first separation layer F2 side can be used as the first layer F3 to be separated.

Specifically, a stacked-layer material in which a polyimide film, a layer containing silicon oxide, silicon nitride, or the like and the functional layer are stacked in this order from the first separation layer F2 side can be used.

«Functional Layer»

The functional layer is included in the first layer F3 to be separated.

For example, a functional circuit, a functional element, an optical element, a functional film, or a layer including a plurality of elements selected from these can be used as the functional layer.

Specifically, a display element that can be used for a display device, a pixel circuit driving the display element, a driver circuit driving the pixel circuit, a color filter, a moisture-proof film, and the like, and a layer including two or more selected from these can be given.

«Bonding Layer»

There is no particular limitation on the bonding layer 30 as long as it bonds the first layer F3 to be separated and the base S5 to each other.

For the bonding layer 30, an inorganic material, an organic material, a composite material of an inorganic material and an organic material, or the like can be used.

For example, a glass layer with a melting point of 400° C. or lower, preferably 300° C. or lower, an adhesive, or the like can be used.

For example, an organic material such as a light curable adhesive, a reactive curable adhesive, a thermosetting adhesive, and/or an anaerobic adhesive can be used for the bonding layer 30.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used.

«Base»

There is no particular limitation on the base S5 as long as it has heat resistance high enough to withstand a manufacturing process and a thickness and a size which can be used in a manufacturing apparatus.

A material that can be used for the base S5 can be the same as that of the first substrate F1, for example.

«Separation Starting Point»

In the processed member 80, the separation starting point F3s may be formed in the vicinity of the edges of the bonding layer 30.

The separation starting point F3s is formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<Structure Example 2 of Processed Member>

A structure of the processed member that can be the stack and is different from the above is described with reference to FIGS. 9B1 and 9B2.

The processed member 90 is different from the processed member 80 in that the other surface of the bonding layer 30 is in contact with one surface of the second layer S3 to be separated instead of the material S5.

Specifically, the processed member 90 includes the first substrate F1 on which the first separation layer F2 and the first layer F3 to be separated whose one surface is in contact with the first separation layer F2 are formed, the second substrate S1 on which the second separation layer S2 and the second layer S3 to be separated whose other surface is in contact with the second separation layer S2 are formed, and the bonding layer 30 whose one surface is in contact with the other surface of the first layer F3 to be separated and whose other surface is in contact with the one surface of the second layer S3 to be separated (see FIGS. 9B1 and 9B2).

«Second Substrate»

As the second substrate S1, a substrate similar to the first substrate F1 can be used. Note that the second substrate S1 does not necessarily have the same structure as the first substrate F1.

«Second Separation Layer»

For the second separation layer S2, a structure similar to that of the first separation layer F2 can be used. For the second separation layer S2, a structure different from that of the first separation layer F2 can also be used.

«Second Layer to be Separated»

As the second layer S3 to be separated, a structure similar to that of the first layer F3 to be separated can be used. For the second layer S3 to be separated, a structure different from that of the first layer F3 to be separated can also be used.

Specifically, a structure may be employed in which the first layer F3 to be separated includes a functional circuit and the second layer S3 to be separated includes a functional layer that prevents diffusion of impurities into the functional circuit.

Specifically, a structure may be employed in which the first layer F3 to be separated includes a light-emitting element that emits light to the second layer S3 to be separated, a pixel circuit driving the light-emitting element, and a driver circuit driving the pixel circuit, and the second layer S3 to be separated includes a color filter that transmits part of light emitted from the light-emitting element and a moisture-proof film that prevents diffusion of impurities into the light-emitting element. Note that the processed member with such a structure can be used for a stack that can be used as a flexible display device.

This embodiment can be combined with any of the other embodiments described in this specification as appropriate.

(Embodiment 6)

In this embodiment, a structure of an information processing device that can be formed using the input/output device of one embodiment of the present invention is described with reference to FIGS. 10A to 10C.

Figure 10A:
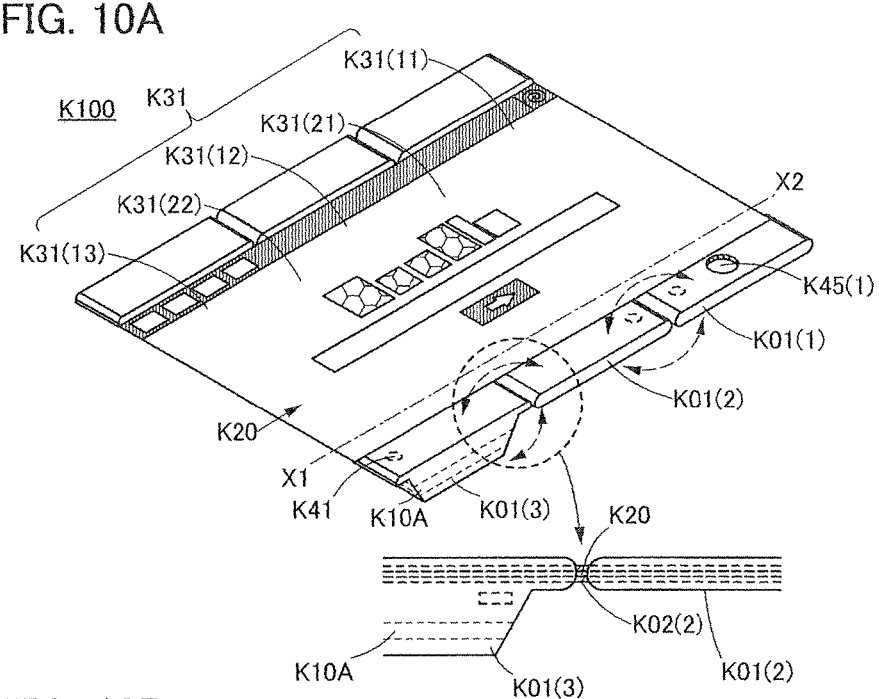
FIGS. 10A to 10C are projection views illustrating a structure of an information processing device of one embodiment.
Figure 10B:
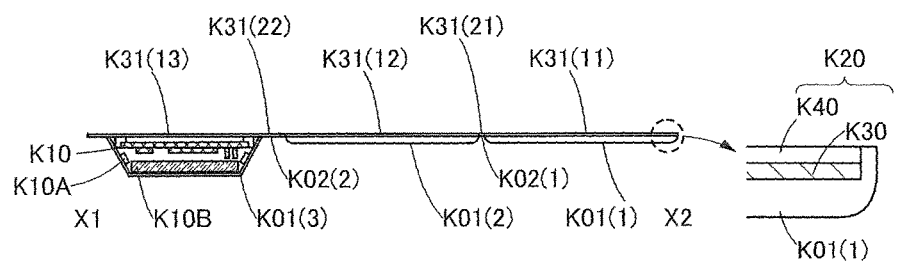
Figure 10C:
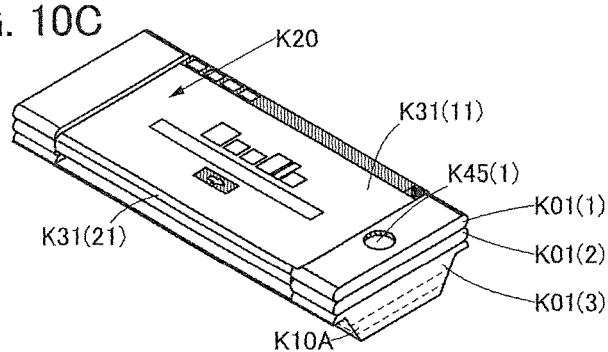

FIGS. 10A to 10C illustrate the information processing device in one embodiment of the present invention.

FIG. 10A is a projection view illustrating an input/output device K20 of an information processing device K100 in one embodiment of the present invention which is unfolded. FIG. 10B is a cross-sectional view of the information processing device K100 taken along line X1-X2 in FIG. 10A. FIG. 10C is a projection view illustrating the input/output device K20 which is folded.

<Structure Example of Information Processing Device>

The information processing device K100 described in this embodiment includes the input/output device K20, an arithmetic device K10, and housings K01(1) to K01(3) (see FIGS. 10A to 10C).

«Input/Output Device»

The input/output device K20 includes a display portion K30 and an input device K40. The input/output device K20 is supplied with image information V and supplies sensing information S.

The display portion K30 is supplied with the image information V and the input device K40 supplies the sensing information S (see FIG. 10B).

The input/output device K20, in which the input device K40 and the display portion K30 integrally overlap with each other, serves not only as the display portion K30 but also as the input device K40.

The input/output device K20 using a touch sensor as the input device K40 and a display panel as the display portion K30 can be referred to as a touch panel.

«Display Portion»

The display portion K30 includes a region K31 where a first region K31(11), a first bendable region K31(21), a second region K31(12), a second bendable region K31(22), and a third region K31(13) are arranged in stripes in this order (see FIG. 10A).

The display portion K30 can be folded and unfolded along a first fold line formed in the first bendable region K31(21) and a second fold line formed in the second bendable region K31(22) (see FIGS. 10A and 10C).

«Arithmetic Device»

The arithmetic device K10 includes an arithmetic portion and a memory portion that stores a program to be executed by the arithmetic portion. The arithmetic device K10 supplies the image information V and is supplied with the sensing information S.

«Housing»

A housing includes the housing K01(1), a hinge K02(1), the housing K01(2), a hinge K02(2), and the housing K01(3) which are placed in this order.

In the housing K01(3), the arithmetic device K10 is stored. The housings K01(1) to K01(3) hold the input/output device K20, and enable the input/output device 1(20 to be folded and unfolded (see FIG. 10B).

In the example described in this embodiment, the information processing device has the three housings connected with one another with the two hinges. The information processing device having this structure can be folded with the input/output device K20 bent at two positions.

Note that n housings (n is a natural number of two or more) may be connected with one another with (n−1) hinges.

The information processing device having this structure can be folded with the input/output device K20 bent at (n−1) positions.

The housing K01(1) overlaps with the first region K31(11) and a button K45(1).

The housing K01(2) overlaps with the second region K31(12).

The housing K01(3) overlaps with the third region K31(13) and stores the arithmetic device K10, an antenna K10A, and a battery K10B.

The hinge K02(1) overlaps with the first bendable region K31(21) and connects the housing KO 1(1) rotatably to the housing K01(2).

The hinge K02(2) overlaps with the second bendable region K31(22) and connects the housing K01(2) rotatably to the housing K01(3).

The antenna K10A is electrically connected to the arithmetic device K10 and supplies a signal or is supplied with a signal.

In addition, the antenna K10A is wirelessly supplied with power from an external device and supplies power to the battery K10B.

The battery K10B is electrically connected to the arithmetic device K10 and supplies power and is supplied with power.

«Folding Sensor»

A folding sensor K41 senses whether the housing is folded or unfolded and supplies information showing the state of the housing.

The arithmetic device K10 is supplied with information showing the state of the housing.

When the information showing the state of the housing K01 is information showing the folded state, the arithmetic device K10 supplies the image information V including a first image to the first region K31(11) (see FIG. 10C).

When the information showing the state of the housing K01 is information showing the unfolded state, the arithmetic device K10 supplies the image information V to the region K31 of the display portion K30 (see FIG. 10A).

Note that this embodiment can be combined with any of the other embodiments in this specification as appropriate.

(Embodiment 7)

In this embodiment, a structure of an information processing device in which the input/output device of one embodiment of the present invention is used in an input/output portion is described with reference to FIGS. 11A1 to 11C2.

FIGS. 11A1 to 11C2 illustrate the information processing devices of embodiments of the present invention.

FIGS. 11A1 to 11A3 are projection views illustrating an information processing device of one embodiment of the present invention.

FIGS. 11B1 and 11B2 are projection views illustrating an information processing device of one embodiment of the present invention.

FIGS. 11C1 and 11C2 are a top view and a bottom view of an information processing device of one embodiment of the present invention.

«Information Processing Device A»

An information processing device 3000A includes an input/output portion 3120 and a housing 3101 supporting the input/output portion 3120 (see FIGS. 11A1 to 11A3).

The information processing device 3000A further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The information processing device 3000A can display information on its side surface and/or top surface.

A user of the information processing device 3000A can supply operation instructions by using a finger in contact with the side surface and/or the top surface.

«Information Processing Device B»

An information processing device 3000B includes the input/output portion 3120 and an input/output portion 3120$b$ (see FIGS. 11B1 and 11B2).

The information processing device 3000B further includes the housing 3101 and a belt-shaped flexible housing 3101$b$ that support the input/output portion 3120.

The information processing device 3000B further includes the housing 3101 supporting the input/output portion 3120$b$.

The information processing device 3000B further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The information processing device 3000B can display information on the input/output portion 3120 supported by the housing 3101 and the belt-shaped flexible housing 3101$b$.

A user of the information processing device 3000B can supply operation instructions by using a finger in contact with the input/output portion 3120.

«Information Processing Device C»

An information processing device 3000C includes the input/output portion 3120 and the housings 3101 and 3101$b$ supporting the input/output portion 3120 (see FIGS. 11C1 and 11C2).

The input/output portion 3120 and the housing 3101$b$ have flexibility.

The information processing device 3000C further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The information processing device 3000C can be folded in two at a portion of the housing 3101$b$.

This embodiment can be combined with any of the other embodiments in this specification as appropriate.

This application is based on Japanese Patent Application serial no. 2014-112825 filed with Japan Patent Office on May 30, 2014, and Japanese Patent Application serial no. 2014-128475 filed with Japan Patent Office on Jun. 23, 2014, the entire contents of which are hereby incorporated by reference.

What is claimed is:

1. An input device comprising:
a sensor panel;
a control portion;
an output portion;
a housing; and
a light-blocking layer,
wherein the sensor panel is supplied with a control signal, supplies a sensing signal, and is in a folded state or an unfolded state, wherein the control portion supplies the control signal,
wherein the output portion is supplied with the sensing signal and supplies sensing information,
wherein the sensor panel comprises a control line, a signal line, and a flexible base,
wherein the control line is supplied with the control signal and extends in a row direction,
wherein the signal line supplies the sensing signal and extends in a column direction,
wherein the base supports the control line and the signal line,
wherein a part of the signal line faces another part of the signal line in the folded state of the sensor panel,
wherein the sensor panel is configured to provide similar electrical interferences generated on the signal line in the folded state and in the unfolded state when a sensing object is close or is in contact with the sensor panel,
wherein the control line comprises a first control line and a second control line,
wherein the signal line comprises a signal line intersecting with the first control line and the second control line,
wherein the control portion supplies a first control signal modulated by a first method to the first control line and supplies a second control signal modulated by a second method that is different from the first method to the second control line,
wherein the output portion is electrically connected to the signal line and separates a first sensing signal based on the first control signal and a second sensing signal based on the second control signal from the sensing signals supplied to the signal line,
wherein the first control signal is supplied to the first control line and the second control signal is supplied to the second control line at substantially the same time,
wherein the sensor panel comprises a first electrode electrically connected to the control line and a second electrode electrically connected to the signal line and including a portion not overlapping with the first electrode,
wherein the base supports the first electrode and the second electrode,
wherein the light-blocking layer is between the first electrode and the base and between the second electrode and the base, and
wherein the light-blocking layer overlaps with the first electrode and the second electrode.

2. The input device according to claim 1,
wherein a part of the second electrode faces another part of the second electrode in the folded state of the sensor panel.

3. The input device according to claim 2, wherein a part of the first electrode is folded in the folded state of the sensor panel.

4. The input device according to claim 2, further comprising a display portion overlapping with the sensor panel,
wherein the display portion comprises a pixel, and
wherein the first electrode or the second electrode includes a net-like conductive film including an opening portion at a position overlapping with the pixel.

5. The input device according to claim 4, wherein the net-like conductive film includes a metal film.

6. The input device according to claim 4, wherein the housing is configured to make the display portion be in a folded state and an unfolded state together with the sensor panel.

7. The input device according to claim 1, wherein the housing is configured to make the sensor panel be in the folded state and the unfolded state.

8. An information processing device comprising:
the input device according to claim 1; and
a hinge, an antenna, or a battery.

9. The input device according to claim 1,
wherein the first control signal has a first frequency,
wherein the second control signal has a second frequency, and
wherein the first frequency is different from the second frequency.

10. The input device according to claim 1,
wherein the signal line comprises a first signal line and a second signal line, and
wherein the output portion further separates a third sensing signal based on the first control signal and a fourth sensing signal based on the second control signal from the sensing signals supplied to the second signal line.

11. The input device according to claim 1, wherein a difference between a capacitance of the signal line in the folded state and a capacitance of the signal line in the unfolded state is small.

12. The input device according to claim 1, wherein the part of the signal line faces another part of the signal line in the folded state of the sensor panel so that a capacitance of the signal line in the folded state of the sensor panel is substantially equal to a capacitance of the signal line in the unfolded state of the sensor panel.

13. The input device according to claim 1, wherein the sensor panel is configured to detect the sensing object in the folded state and in the unfolded state on the basis of a same threshold voltage.

14. An input device comprising:
a sensor panel;
a fold sensing portion;
a control portion;
an output portion;
a housing; and
a light-blocking layer,
wherein the sensor panel is supplied with a control signal, supplies a sensing signal, and is folded and unfolded,
wherein the fold sensing portion senses a folded state and an unfolded state of the sensor panel and supplies folding information,
wherein the control portion supplies the control signal,
wherein the output portion is supplied with the sensing signal and the folding information and supplies sensing information on the basis of the sensing signal and the folding information,
wherein the sensor panel comprises a control line, a signal line, and a flexible base,
wherein the control line is supplied with the control signal and extends in a row direction,
wherein the signal line supplies the sensing signal and extends in a column direction,
wherein the base supports the control line and the signal line,
wherein a part of the signal line faces another part of the signal line in the folded state of the sensor panel,
wherein the sensor panel is configured to provide similar electrical interferences generated on the signal line in the folded state and in the unfolded state when a sensing object is close or is in contact with the sensor panel,
wherein the control line comprises a first control line and a second control line, wherein the signal line comprises a signal line intersecting with the first control line and the second control line, wherein the control portion supplies a first control signal modulated by a first method to the first control line and supplies a second control signal modulated by a second method that is different from the first method to the second control line, and wherein the output portion is electrically connected to the signal line and separates a first sensing signal based on the first control signal and a second sensing signal based on the second control signal from the sensing signals supplied to the signal line, wherein the first control signal is supplied to the first control line and the second control signal is supplied to the second control line at substantially the same time, wherein the sensor panel comprises a first electrode electrically connected to the control line and a second electrode electrically connected to the signal line and including a portion not overlapping with the first electrode, wherein the base supports the first electrode and the second electrode, wherein the light-blocking layer is between the first electrode and the base and between the second electrode and the base, and wherein the light-blocking layer overlaps with the first electrode and the second electrode.

15. The input device according to claim 14, wherein a part of the second electrode is located to face another part of the second electrode in the folded state of the sensor panel.

16. The input device according to claim 15, wherein a part of the first electrode is folded in the folded state of the sensor panel.

17. The input device according to claim 15, further comprising a display portion overlapping with the sensor panel,
wherein the display portion comprises a pixel, and
wherein the first electrode or the second electrode includes a net-like conductive film including an opening portion at a position overlapping with the pixel.

18. The input device according to claim 17, wherein the net-like conductive film includes a metal film.

19. The input device according to claim 17, wherein the housing is configured to make the display portion be in a folded state and an unfolded state together with the sensor panel.

20. The input device according to claim 14, wherein the housing is configured to make the sensor panel be in the folded state and the unfolded state.

21. An information processing device comprising:
the input device according to claim 14; and
a hinge, an antenna, or a battery.

22. The input device according to claim 14,
wherein the first control signal has a first frequency,
wherein the second control signal has a second frequency, and
wherein the first frequency is different from the second frequency.

23. The input device according to claim 14,
wherein the signal line comprises a first signal line and a second signal line, and
wherein the output portion further separates a third sensing signal based on the first control signal and a fourth sensing signal based on the second control signal from the sensing signals supplied to the second signal line.

24. An input device comprising:
a sensor panel;
a control portion;
an output portion; and
a housing;
wherein the sensor panel is supplied with a control signal, supplies a sensing signal, and is in a folded state or an unfolded state
wherein the control portion supplies the control signal,
wherein the output portion is supplied with the sensing signal and supplies sensing information,
wherein the sensor panel comprises a control line, a signal line, and a flexible base,
wherein the control line is supplied with the control signal and extends in a row direction,
wherein the signal line supplies the sensing signal and extends in a column direction,
wherein the base supports the control line and the signal line,
wherein a part of the signal line faces another part of the signal line in the folded state of the sensor panel, and
wherein the sensor panel is configured to provide similar electrical interferences generated on the signal line in the folded state and in the unfolded state when a sensing object is close or is in contact with the sensor panel.

25. The input device according to claim 24,
wherein the sensor panel comprises a first electrode electrically connected to the control line and a second electrode electrically connected to the signal line and including a portion not overlapping with the first electrode,
wherein the base supports the first electrode and the second electrode, and
wherein a part of the second electrode faces another part of the second electrode in the folded state of the sensor panel.

26. The input device according to claim 24, further comprising a light-blocking layer between the control line and the base and between the signal line and the base.

27. The input device according to claim 25, further comprising a display portion overlapping with the sensor panel each other,
wherein the display portion comprises a pixel, and
wherein the first electrode or the second electrode includes a net-like conductive film including an opening portion at a position overlapping with the pixel.

* * * * *